(12) United States Patent
Glickman et al.

(10) Patent No.: US 9,505,555 B2
(45) Date of Patent: Nov. 29, 2016

(54) CHASSIS STACKER

(75) Inventors: Myron Glickman, Arlington Heights, IL (US); John J. Lanigan, Sr., Orland Park, IL (US); John J. Lanigan, Jr., New Lenox, IL (US)

(73) Assignee: Mi-Jack Products, Inc., Hazel Crest, IL (US)

( * ) Notice: Subject to any disclaimer, the term of this patent is extended or adjusted under 35 U.S.C. 154(b) by 131 days.

(21) Appl. No.: 13/359,119

(22) Filed: Jan. 26, 2012

(65) Prior Publication Data

US 2014/0212247 A1    Jul. 31, 2014

Related U.S. Application Data

(63) Continuation-in-part of application No. 13/175,526, filed on Jul. 1, 2011.

(51) Int. Cl.
*B65G 1/04* (2006.01)

(52) U.S. Cl.
CPC ........... *B65G 1/0442* (2013.01); *B65G 1/0464* (2013.01); *B65G 2201/0294* (2013.01)

(58) Field of Classification Search
CPC .............. B65G 1/0442; B65G 1/0464; B65G 2201/0294
USPC .................................................. 414/260, 281
See application file for complete search history.

(56) References Cited

U.S. PATENT DOCUMENTS

| | | | |
|---|---|---|---|
| 2,238,573 A | 4/1941 | Steedman | |
| 3,519,150 A | 7/1970 | Keenan et al. | |
| 4,427,117 A | 1/1984 | Matthewson et al. | |
| 4,437,807 A | 3/1984 | Perrott | |
| 4,439,094 A | 3/1984 | Riley | |

(Continued)

FOREIGN PATENT DOCUMENTS

| | | |
|---|---|---|
| CN | 1814517 | 8/2006 |
| DE | 20 2006 002 586 U1 | 5/2006 |

(Continued)

OTHER PUBLICATIONS

European Patent Office, Supplementary European Search Report for EP13740687.2, dated Nov. 16, 2015, Applicant, Mi-Jack Products, Inc., 6 pages.

(Continued)

*Primary Examiner* — Saul Rodriguez
*Assistant Examiner* — Ashley Romano
(74) *Attorney, Agent, or Firm* — McCracken & Gillen LLC

(57) ABSTRACT

A chassis stacker having a first and a second vertical storage rack displaced from one another by a distance wide enough to accommodate a trailer chassis, and connected at a top end by a trolley rail support beam. A trolley is positioned on the trolley rail support beam, said trolley having an elevation system capable of raising and lowering a first and a second stabilizing beam that are suspended from the trolley and guided in their vertical motion by low-friction, storage-rack contact members attached at respective first and second ends of the elevating structure, said contact members in contact with an inner surface of the respective first and second vertical storage racks. A first and a second stabilizing-beam trolley is attached to the, respective, first and second stabilizing beams while a spreader containing a chassis-clamping mechanism extends between and attaches to the first and the second stabilizing beam trolley.

11 Claims, 25 Drawing Sheets

(56) References Cited

U.S. PATENT DOCUMENTS

| | | | |
|---|---|---|---|
| 4,549,663 A | 10/1985 | Corbett, Jr. et al. | |
| 4,600,350 A | 7/1986 | Matthewson et al. | |
| 4,826,384 A | 5/1989 | Okura et al. | |
| 4,936,730 A | 6/1990 | Morioka | |
| 4,952,118 A | 8/1990 | Macmillan | |
| 4,971,506 A | 11/1990 | Givati | |
| 5,551,831 A | 9/1996 | Corbett | |
| 6,325,586 B1* | 12/2001 | Loy | 414/281 |
| 6,345,948 B1 | 2/2002 | Irish | |
| 6,626,304 B1 | 9/2003 | Corbett et al. | |
| 7,316,536 B2 | 1/2008 | Evans et al. | |
| 8,613,582 B2 | 12/2013 | Shani | |
| 2005/0220559 A1 | 10/2005 | Yang et al. | |
| 2007/0032903 A1 | 2/2007 | Tsujimoto | |
| 2007/0128009 A1 | 6/2007 | Lee | |
| 2008/0075566 A1 | 3/2008 | Benedict et al. | |
| 2008/0075568 A1 | 3/2008 | Benedict et al. | |
| 2008/0075569 A1 | 3/2008 | Benedict et al. | |
| 2008/0208389 A1* | 8/2008 | Checketts | 700/214 |
| 2009/0261546 A1 | 10/2009 | Rowland | |
| 2010/0034626 A1 | 2/2010 | Reiniger et al. | |
| 2010/0183409 A1* | 7/2010 | Checketts et al. | 414/231 |
| 2010/0189534 A1* | 7/2010 | Jung | 414/281 |
| 2010/0232926 A1 | 9/2010 | Awad | |
| 2010/0284771 A1 | 11/2010 | Stierler | |

FOREIGN PATENT DOCUMENTS

| | | |
|---|---|---|
| FR | 2879576 | 6/2009 |
| GB | 2183620 | 6/1987 |
| JP | 58122232 | 7/1983 |
| JP | 60031440 | 2/1985 |
| JP | 62065498 | 4/1987 |
| JP | 62088704 | 4/1987 |
| JP | 63160912 | 7/1988 |
| JP | 63167849 | 7/1988 |
| JP | 63185702 | 8/1988 |
| JP | 01117104 | 5/1989 |
| JP | 01172113 | 7/1989 |
| JP | 04060068 | 2/1992 |
| JP | 05338745 | 12/1993 |
| JP | 06115649 | 4/1994 |
| JP | 07112808 | 5/1995 |

OTHER PUBLICATIONS

International Search Report and Written Opinion, for International Application No. PCT/US13/23282, Applicant, Mi-Jack Products, Inc., dated Apr. 15, 2013 (15 pages).

International Preliminary Report on Patentability, for International Application No. PCT/US13/23282, Applicant, Mi-Jack Products, Inc., dated Aug. 7, 2014 (6 pages).

* cited by examiner

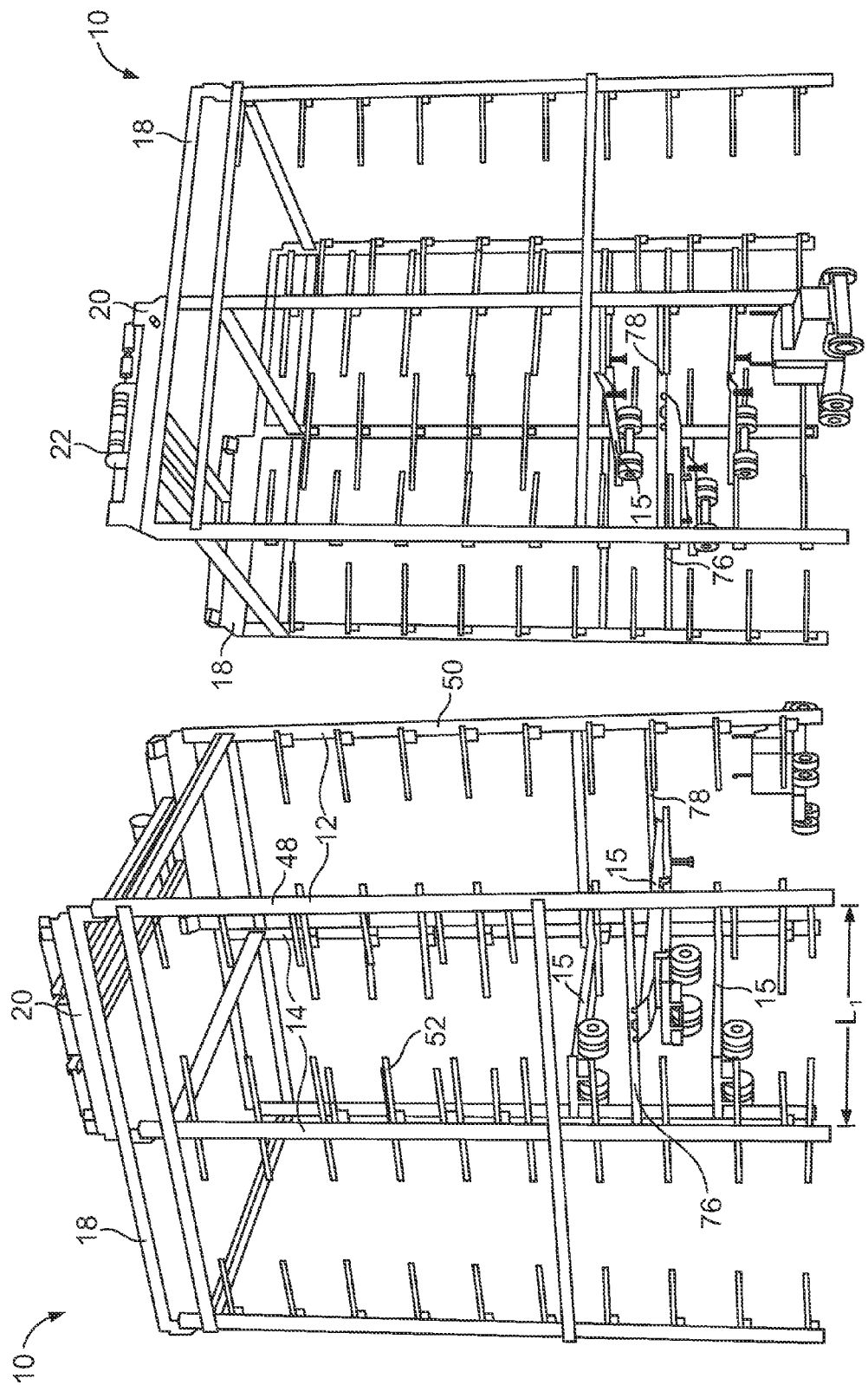

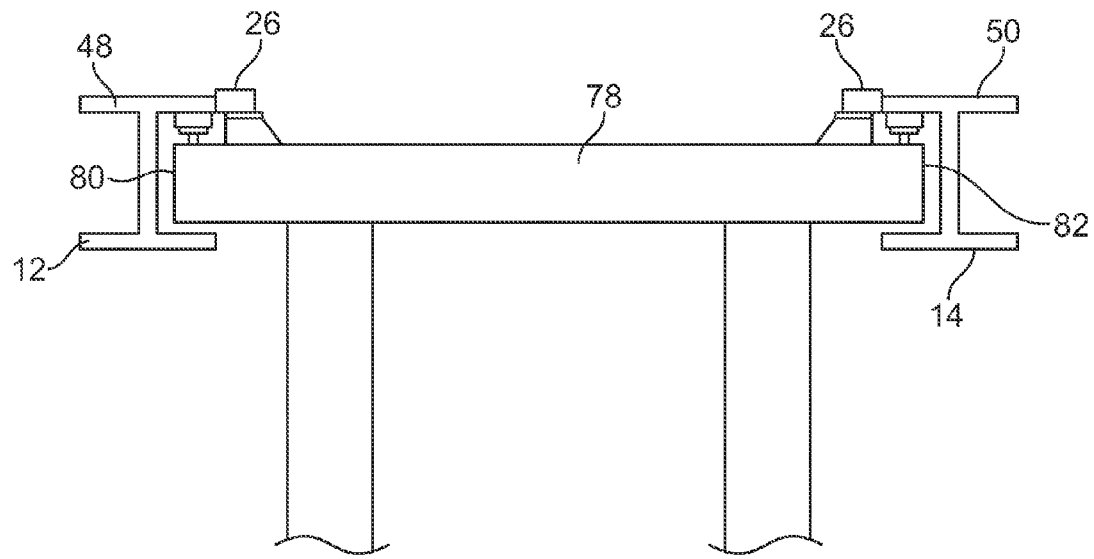
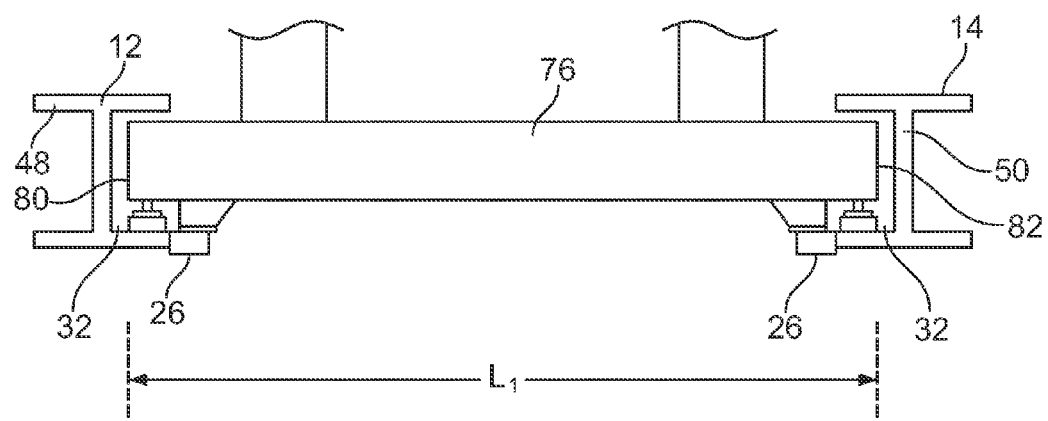
FIG. 6

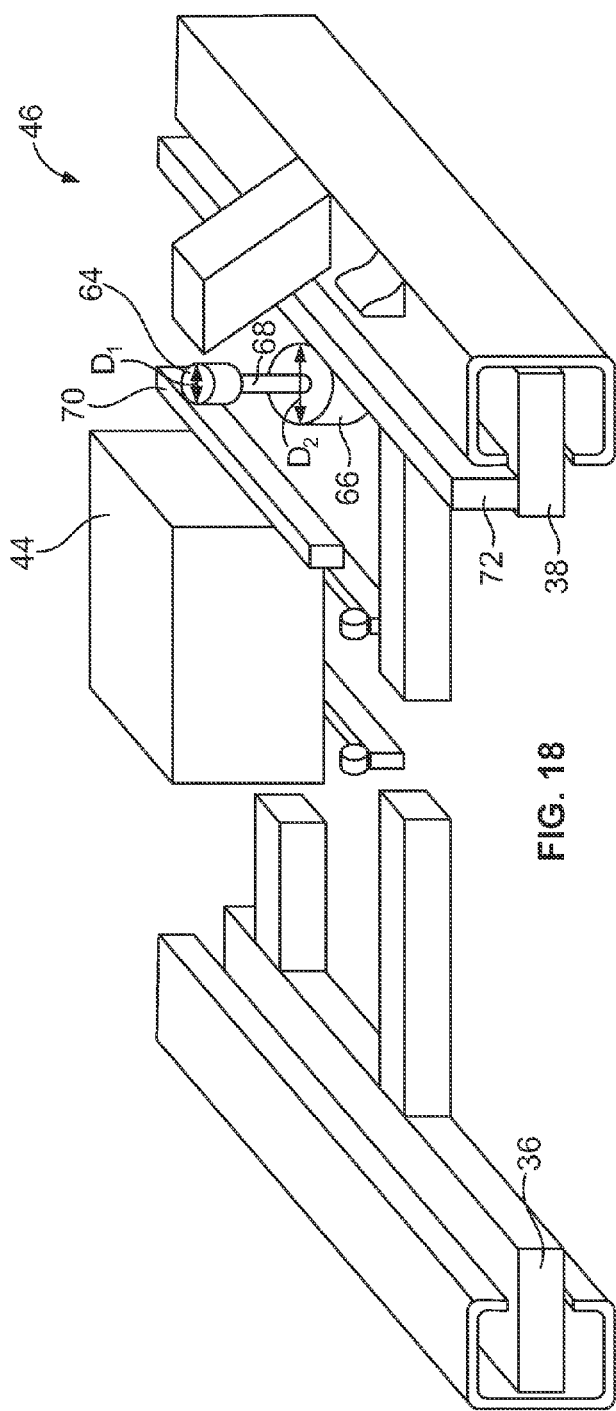
FIG. 18
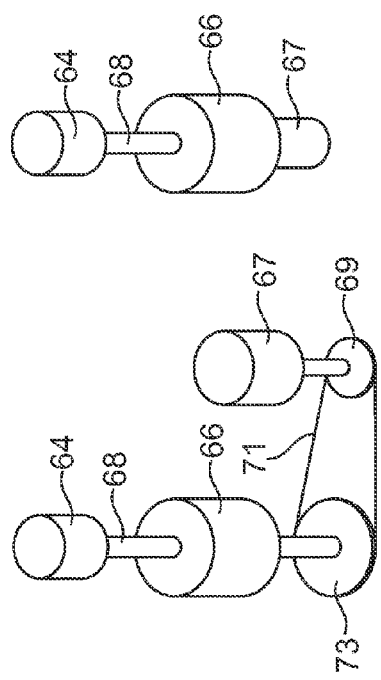
FIG. 18A
FIG. 18B

CHASSIS STACKER

CROSS-REFERENCE TO RELATED PATENT APPLICATIONS

This patent application is a continuation-in-part of copending U.S. patent application Ser. No. 13/175,526, entitled, System and Method of Handling Chassis, filed Jul. 1, 2011, herein incorporated by reference.

FIELD OF THE INVENTION

This invention pertains to equipment for storing trailer chassis in general and, in particular, for stacking such trailer chassis.

BACKGROUND OF THE INVENTION

Large container handling facilities such as ports or intermodal rail container yards require the ability to handle large quantities of trailer chassis in order to accept containers that must be transferred from storage stacks or rail cars to trucks for over the road travel to a final destination or, for possible repositioning within the handling facility. The storage and handling of empty chassis is an on-going, time consuming task for the container yard.

In particular, the storage of empty chassis can take up an enormous amount of space. Furthermore, with empty chassis stored over a large area, considerable time is spent in locating and retrieving the empty chassis. Additionally, many facilities store chassis by leaning them against one another is a near vertical orientation. This results in frequent damage to the chassis and high annual repair costs. For these and other reasons, a system for improving the efficiency of the chassis handling task would be an important improvement in the art.

BRIEF SUMMARY OF THE INVENTION

Disclosed is a chassis stacker capable of storing chassis in a horizontal orientation. The chassis stacker is comprised of a first and a second vertical storage rack, said first and second racks displaced from one another by a first distance wide enough to accommodate a trailer chassis, and connected at a top end by a trolley rail support beam. A trolley is positioned on the trolley rail support beam. The trolley having an elevation system capable of raising and lowering a first and a second stabilizing beam that are suspended from the trolley and guided in their vertical motion by low-friction, storage-rack contact members attached at respective first and second ends of the elevating structure, said contact members in contact with an inner surface of the respective first and second vertical storage racks. A first and a second stabilizing-beam trolley is attached to the, respective, first and second stabilizing beams while a spreader containing a chassis-clamping mechanism extends between and attaches to the first and the second stabilizing beam trolley. A method for raising and lowering trailer chassis is also disclosed.

BRIEF DESCRIPTION OF THE DRAWINGS

FIG. 1 is a perspective view of multiple chassis storage racks using one embodiment of an elevating structure.

FIG. 2 is a perspective view of multiple chassis storage racks using one embodiment of an elevating structure.

FIG. 6 is a pictorial illustration showing the guide members in contact with the storage racks.

FIG. 18 is a pictorial illustration showing the drive system used on an elevating structure in one embodiment.

FIG. 18A is a view of a motor and drive system used on an elevating structure.

FIG. 18B is a view of the pinions and common shaft used in the drive system on an elevating structure.

DETAILED DESCRIPTION OF THE EMBODIMENTS

Figure 3:
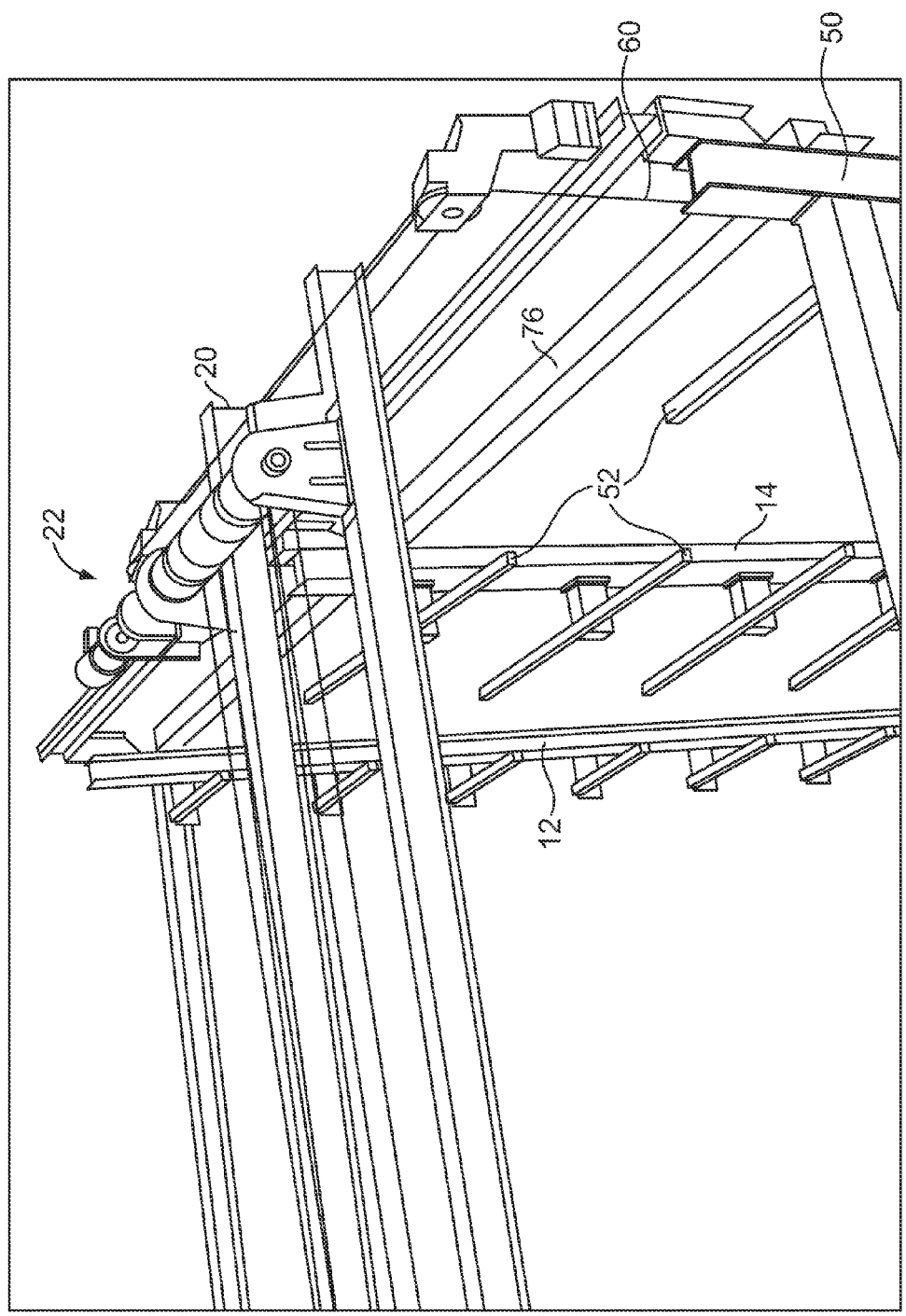
FIG. 3 is a perspective view showing a trolley mounted on a support rail.

The following further illustrate the disclosure but, of course, should not be construed as in any way limiting its scope.

FIGS. 1 and 2, the chassis stacker 10 is comprised of a first and a second vertical storage rack 12, 14. These first and second storage racks 12, 14 are displaced from one another by a first distance $L_1$ wide enough to accommodate a trailer chassis 15, and connected at a top end 16 by a trolley rail support beam 18. A rail-wheel mounted trolley 20 is positioned on the trolley rail support beam 18, as shown in FIGS. 3 and 4.

Figure 4:
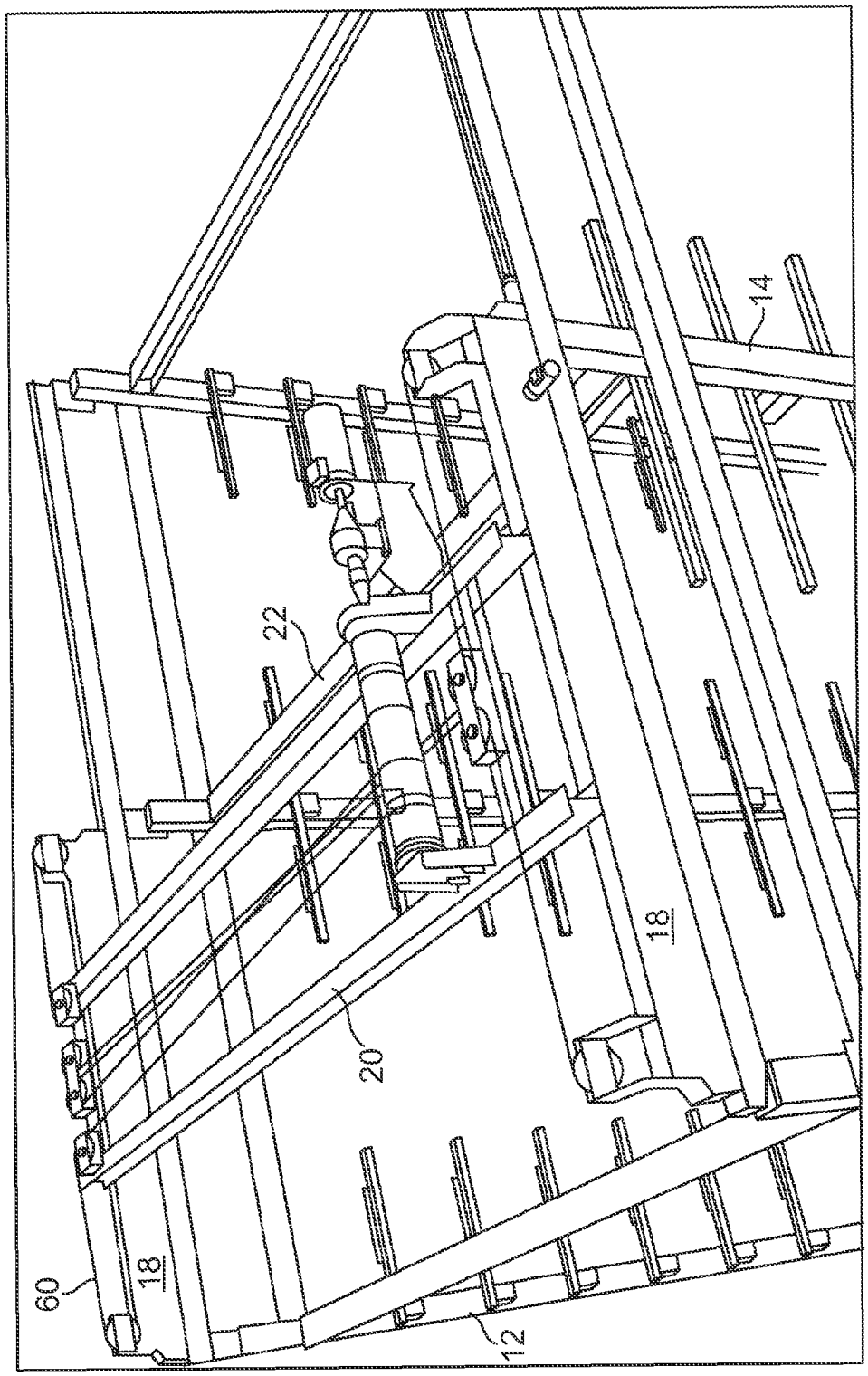
FIG. 4 is a perspective view showing a trolley mounted on a support rail.
Figure 5:
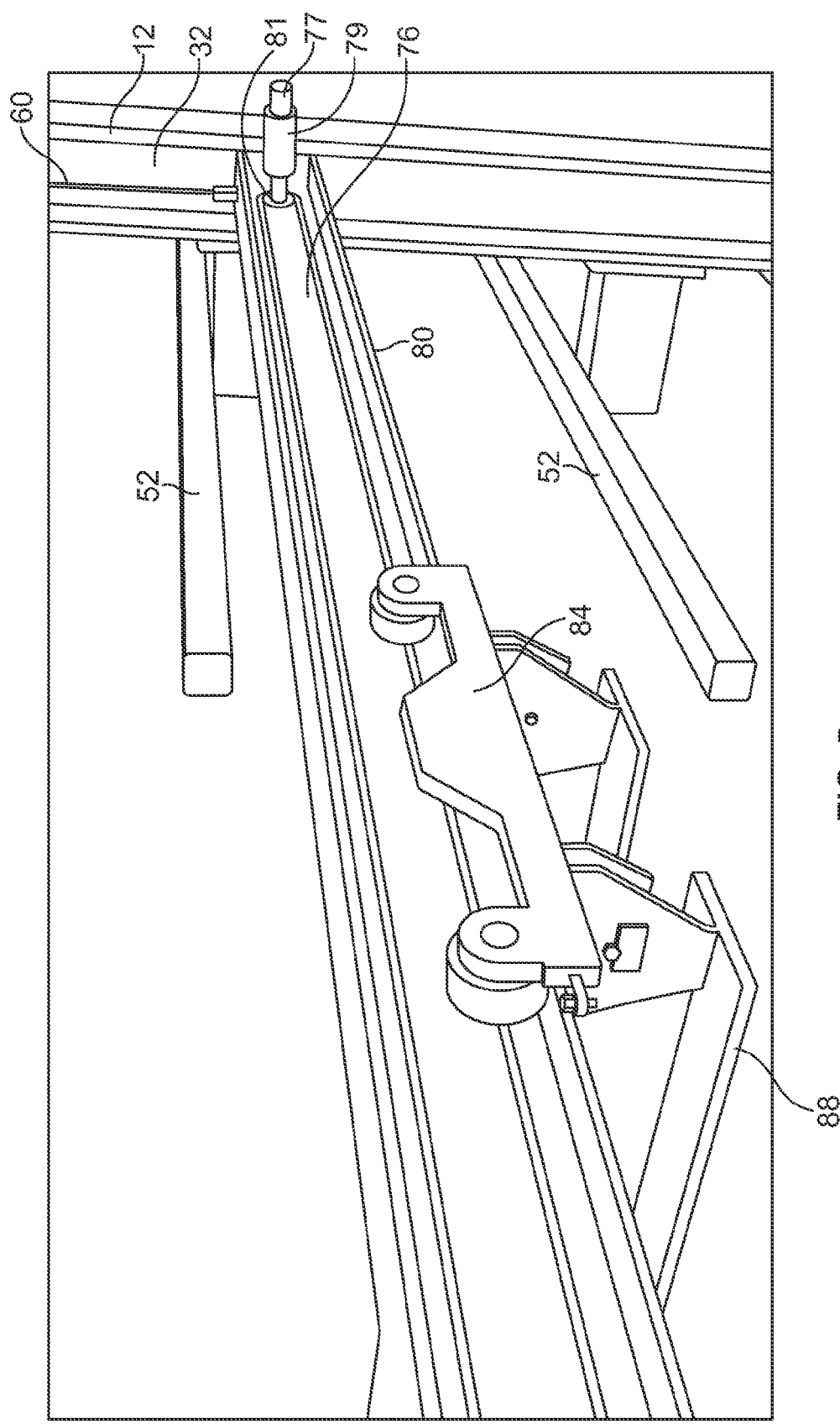
FIG. 5 is a perspective view showing a stabilizing beam trolley and drive system and chain used in one embodiment.

The trolley 20 has an elevation system 22 capable of raising and lowering a first and a second stabilizing beam 76, 78 that are suspended from the trolley 20, as shown in FIGS. 3-5, and guided in their vertical motion by low-friction, storage-rack contact members 26, as shown in FIG. 6, attached at respective first and second ends of each 80, 82 of the stabilizing beams 76, 78. These contact members 26 are in contact with an inner surface 32 of the respective first and second vertical storage racks 12, 14.

Figure 7:
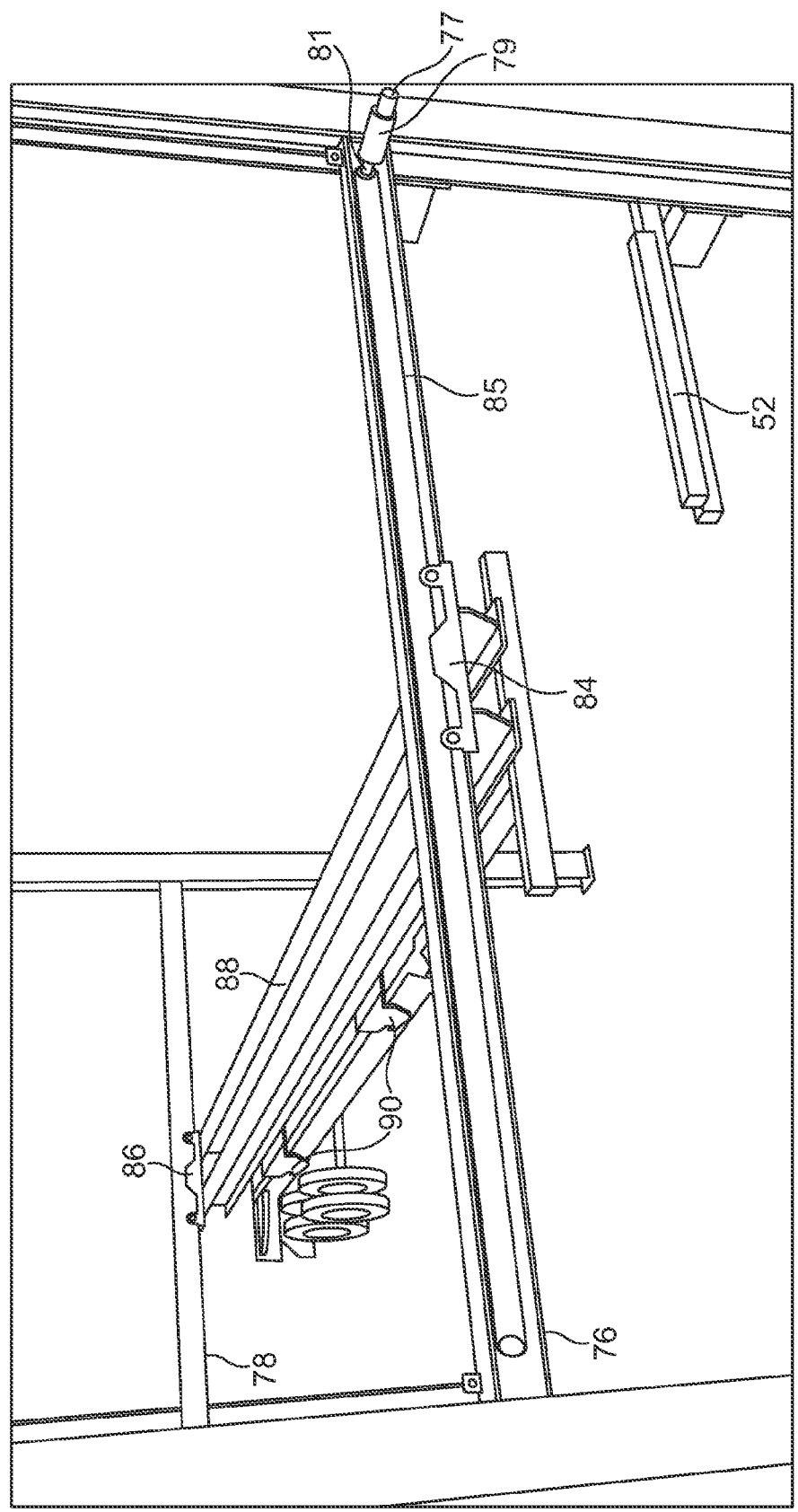
FIG. 7 is a perspective view showing a spreader and stabilizing beam elevating structure used in one embodiment.

A first and a second stabilizing-beam trolley 84, 86, as shown in FIG. 7 is attached to the, respective, first and second stabilizing beams 76, 78, while a spreader 88 containing a chassis-clamping mechanism 90 extends between and attaches to the first and the second stabilizing beam trolley 84, 86, as shown in FIG. 7. A drive systems such as a drive chain 85 is used to move the stabilizing beam trolley 84, 86 along the stabilizing beam 76, 78. As shown in FIGS. 5 and 7, the chain may be driven by a gearbox 79 which is driven by an electric or hydraulic motor 77, which drives a chain sprocket 81. The stabilizing beam trolleys, 84, 86 may also be self propelled by a motor and gearbox driving the trolley wheels.

Figure 8:
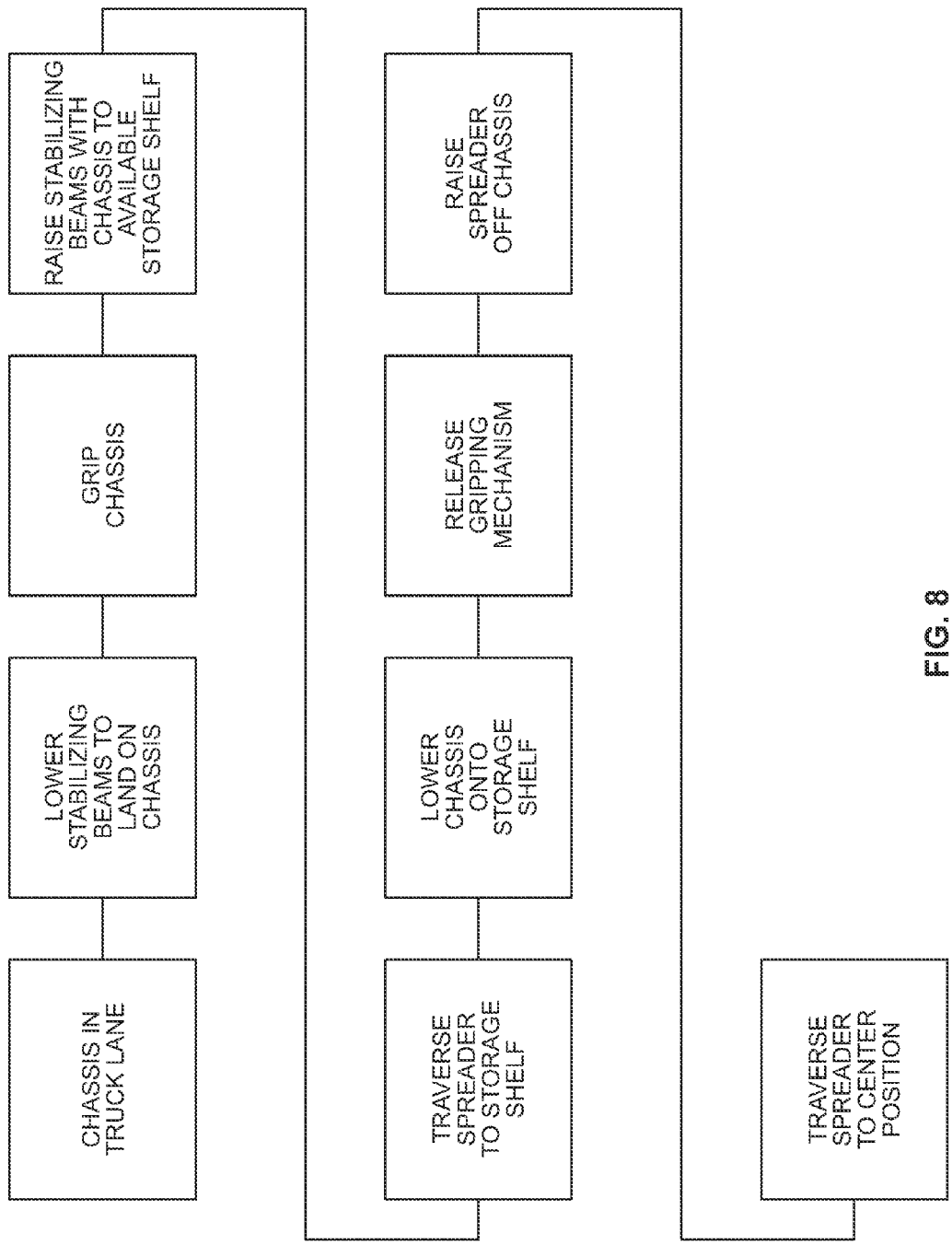
FIG. 8 is a flow chart showing the steps associated with storing a chassis on a storage rack in one of the embodiments.
Figure 21:
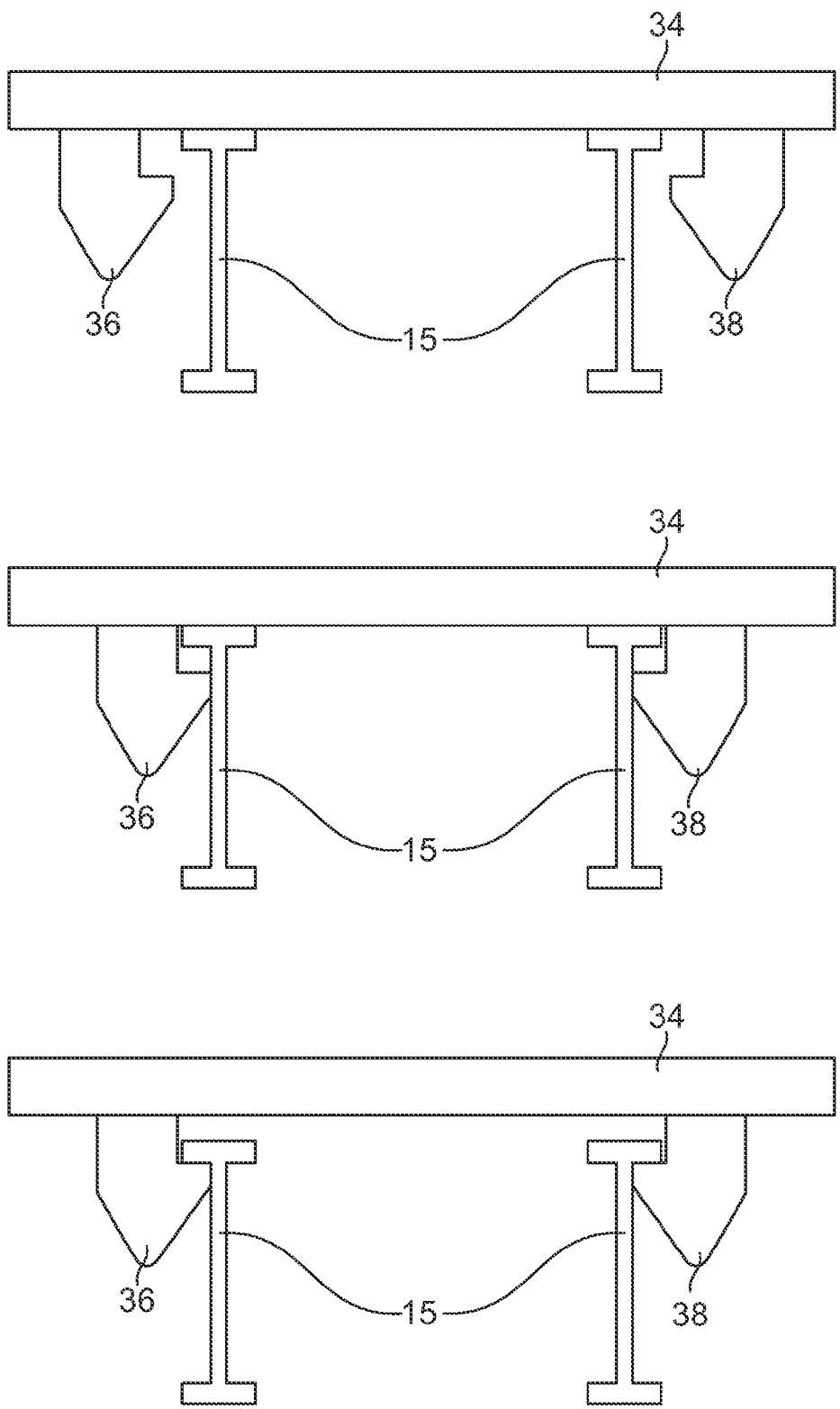
FIG. 21 is a pictorial representation showing the steps in which the chassis contact members contact a chassis.

FIG. 8 shows a flow chart that describes what happens when using this embodiment to store an empty trailer chassis 15. A trailer chassis 15 is positioned between the first and a second vertical storage rack 12, 14. An operator then lowers on to the chassis 15 the first and second stabilizing beams 76, 78 which support a spreader 88 containing a chassis clamping mechanism 90. The chassis clamping mechanism 90 is then engaged with the chassis 15. Once the chassis 15 is securely engaged with the chassis clamping mechanism 90, the first and the second stabilizing beams 76, 78 are raised so as to align the chassis 15 with an empty storage space in one of the first and second vertical storage racks 12, 14. The spreader 88 is then traversed along the first and second stabilizing beams 76, 78, through the use of the first and second stabilizing beam trolley 84, 86 so as to align the chassis 15 with the empty storage space. The chassis 15 is then lowered on to a chassis support member 52 located in one of the first and second vertical storage racks 12, 14. Once the chassis 15 is securely positioned on the chassis support member 52, the chassis 15 is disengaged from the chassis clamping mechanism 90 and the spreader 88 is repositioned between the first and the second vertical storage rack 12, 14. The method of clamping the chassis is as shown in FIG. 21.

Figure 9:
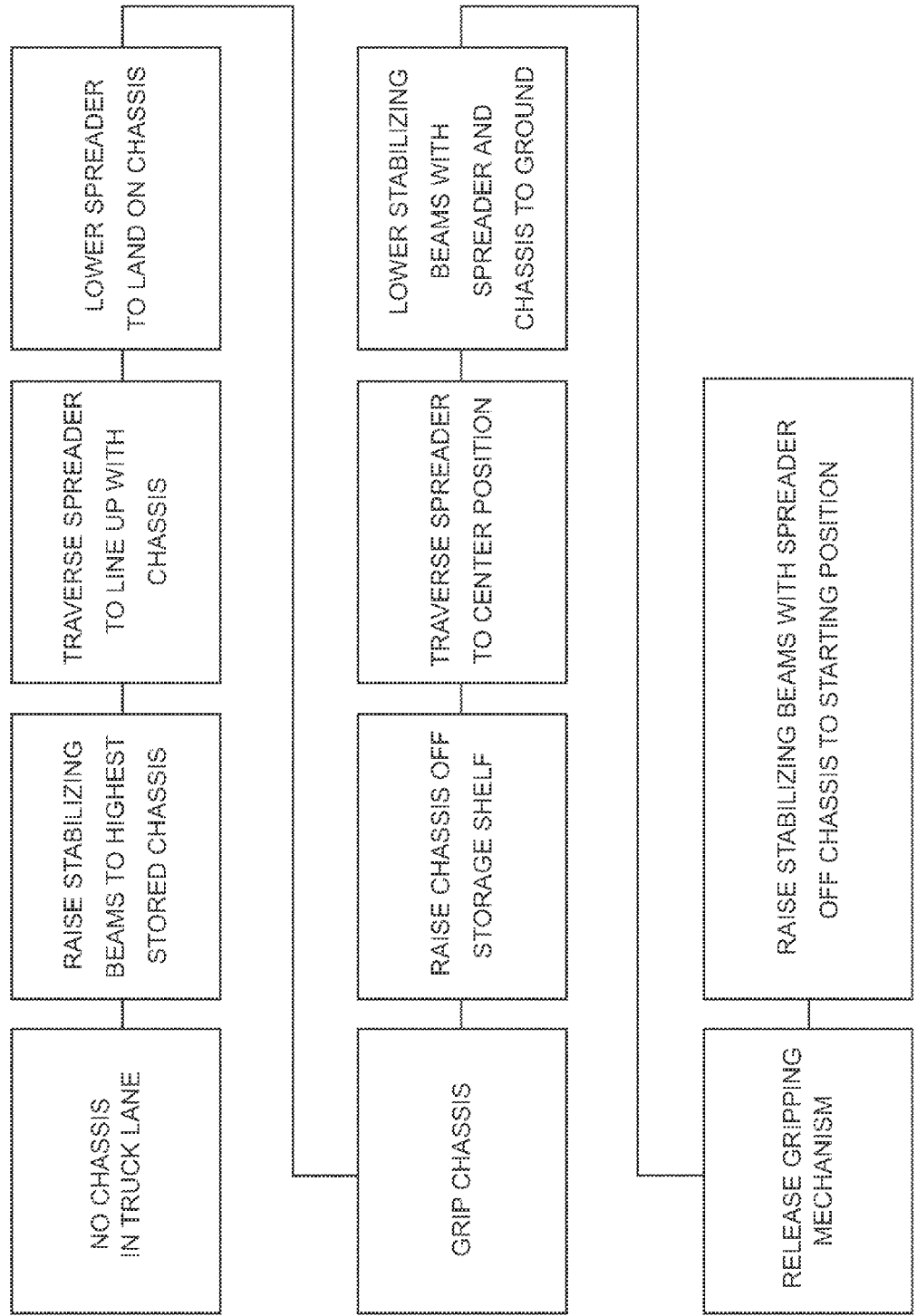
FIG. 9 is a flow chart showing the steps associated with retrieving a chassis on a storage rack in one of the embodiments.

FIG. 9 shows the process of retrieving an empty chassis 15 from a storage rack 12 using the stabilizing beam embodiment. During operation of this embodiment, the stabilizing beams 76, 78 are raised to the highest stored chassis 15. The traverse spreader 88 is then lined up with the chassis 15 to be retrieved. Once aligned, the spreader 88 is lowered onto the chassis 15 where the chassis-clamping mechanism 90 then grips the chassis 15. Once the chassis 15 is securely gripped, the chassis 15 is raised off of the chassis support member 52 and the spreader 88 is moved to center position between the two storage racks, 12 and 14. After the spreader 88 is centered, the stabilizing beams 76, 78 and the spreader 88 are lowered along with the chassis 15 to the ground. When the chassis 15 is safely on the ground, the chassis-clamping mechanism 90 is released and the stabilizing beams 76, 78 and spreader 88 are raised to an elevated position, clear of the chassis 15 on the ground.

Figure 10:
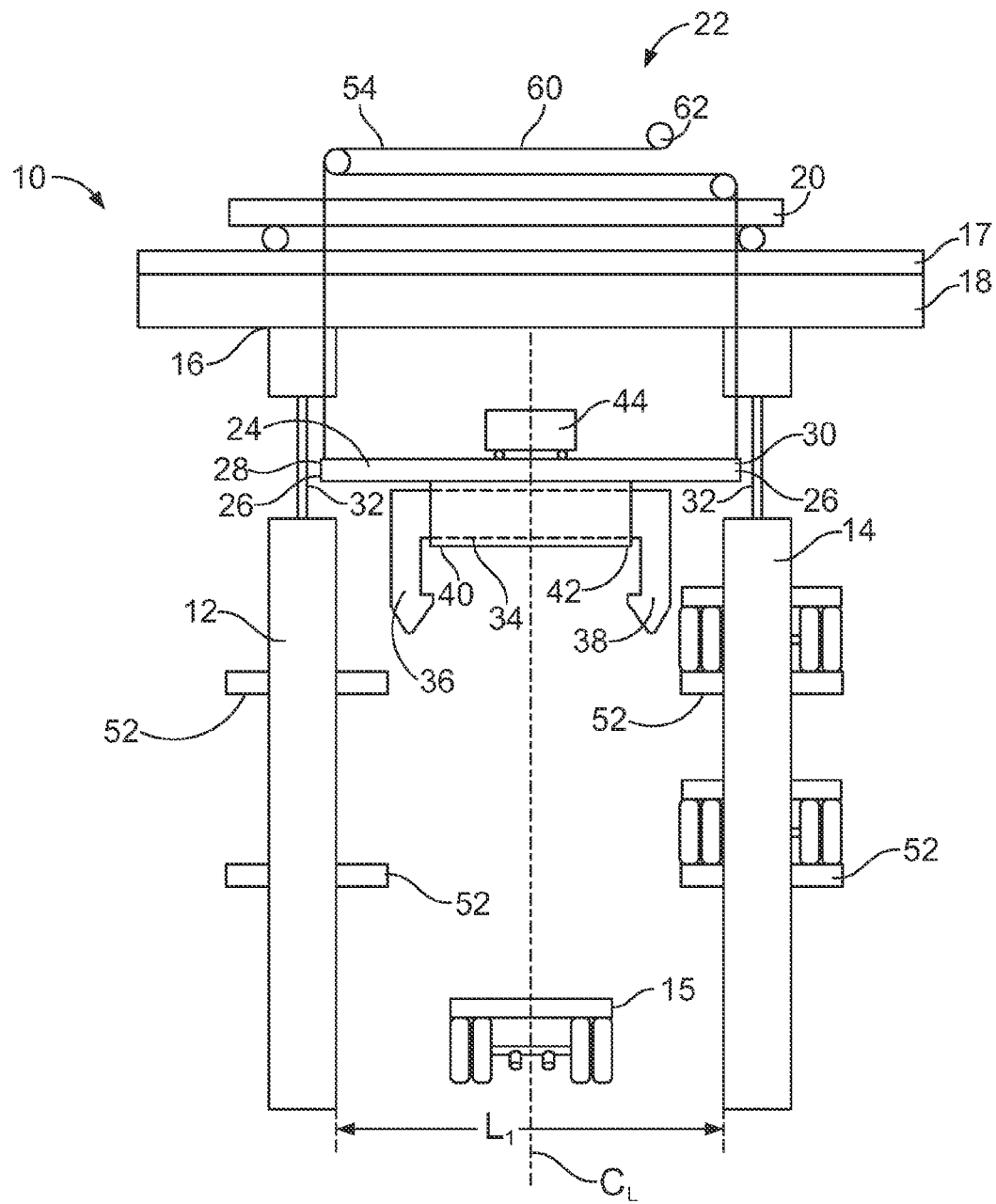
FIG. 10 is a pictorial illustration of an end of the two chassis storage racks and a truck lane.
Figure 11:
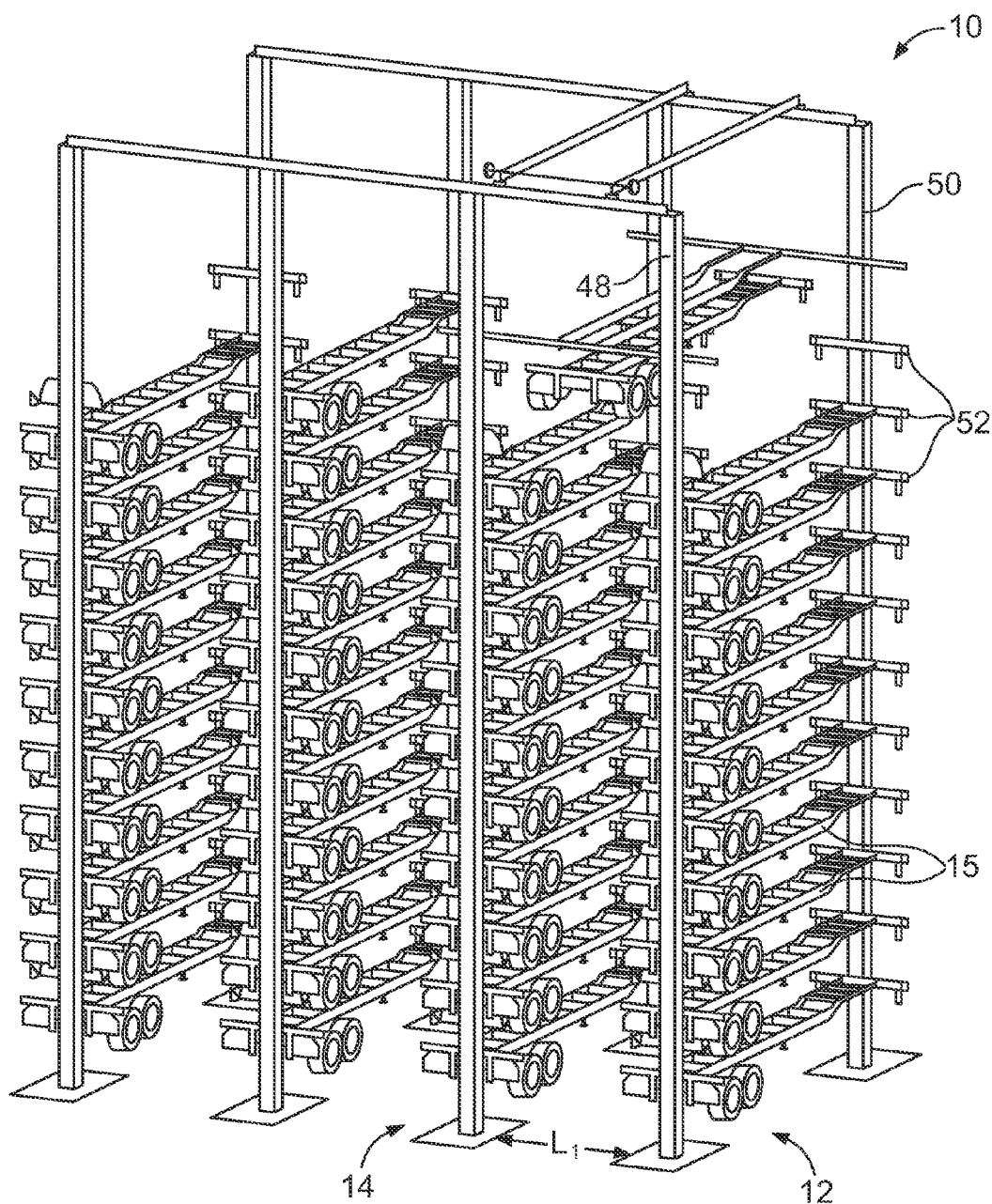
FIG. 11 is a perspective view showing multiple chassis storage racks and a truck lanes.

In another embodiment, as shown in FIGS. 10 and 11, a chassis stacker 10 comprised of a first and a second vertical storage rack 12, 14 that are displaced from one another by a first distance $L_1$ that is wide enough to accommodate a trailer chassis 15. The storage racks 12, 14 are connected at a top end 16 by a trolley rail support beam 18. A trolley 20 is positioned on the trolley rail support beam 18. In an embodiment, the trolley 20 is a rail-wheel mounted trolley 20, as shown in FIG. 10.

Figure 12:
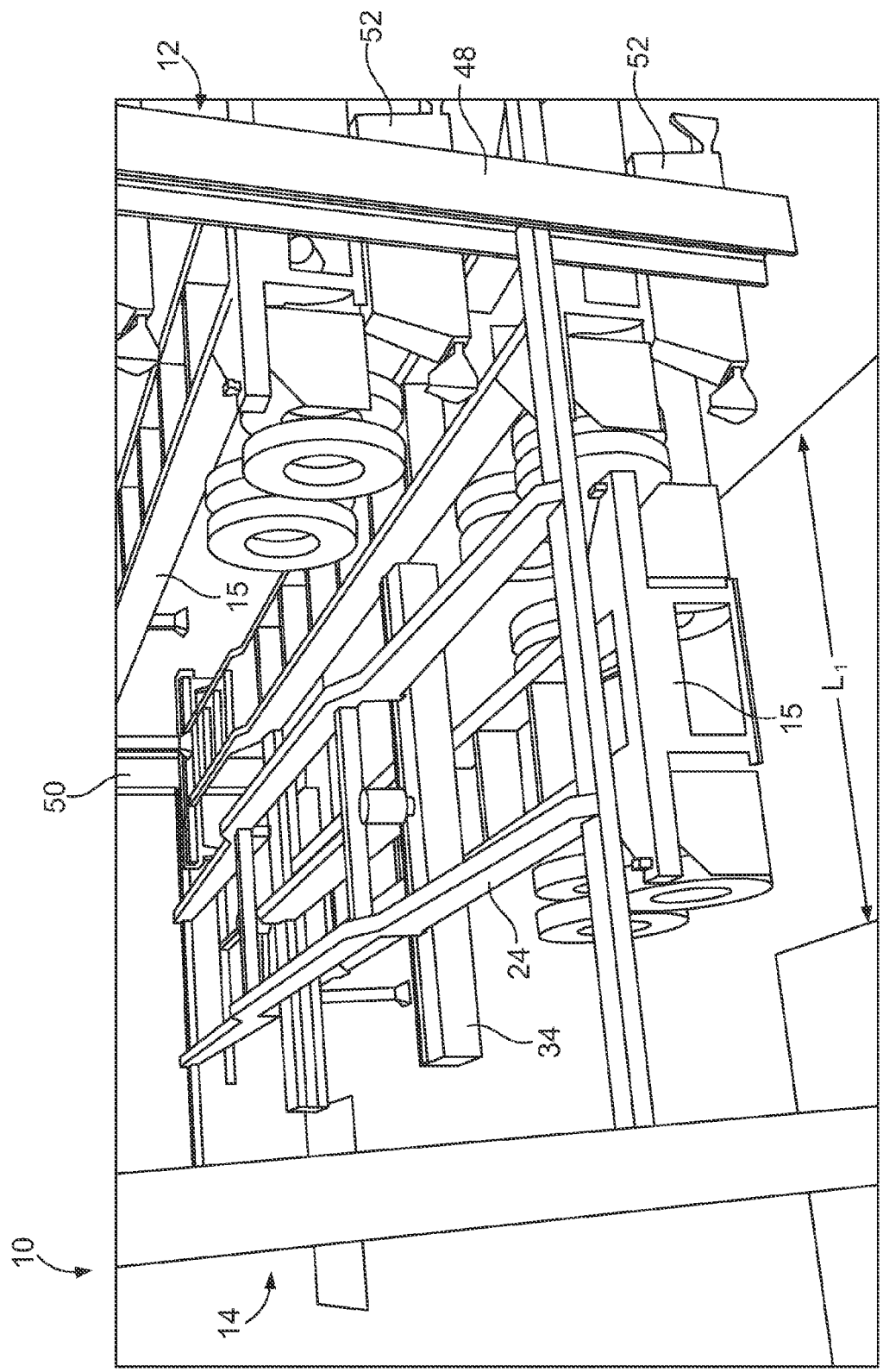
FIG. 12 is a perspective view showing the chassis gripping member, used in one embodiment, attached to a chassis on the ground.
Figure 13:
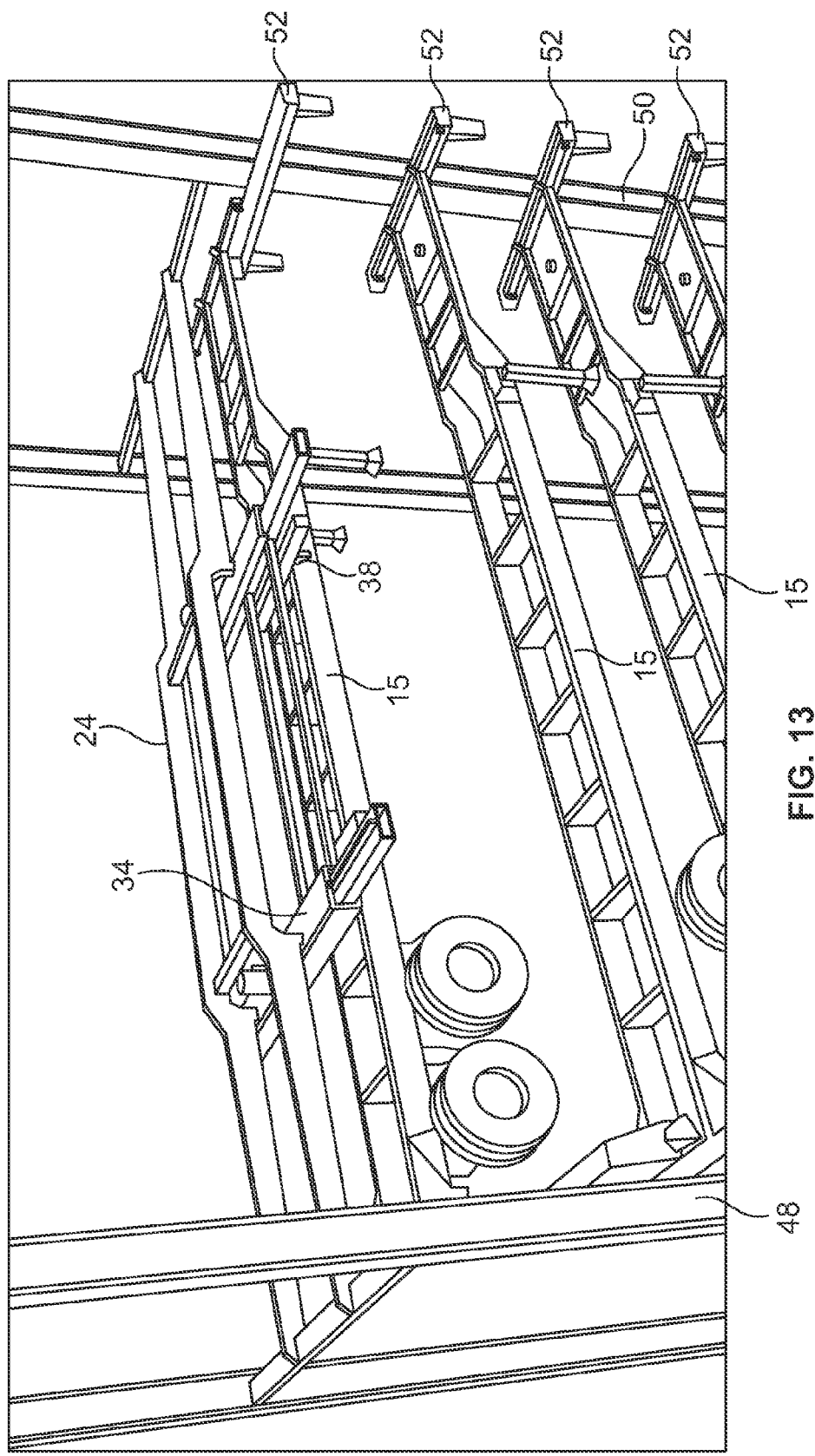
FIG. 13 is a perspective view showing the chassis gripping member, used in one embodiment, elevating a chassis to a respective storage location.
Figure 14:
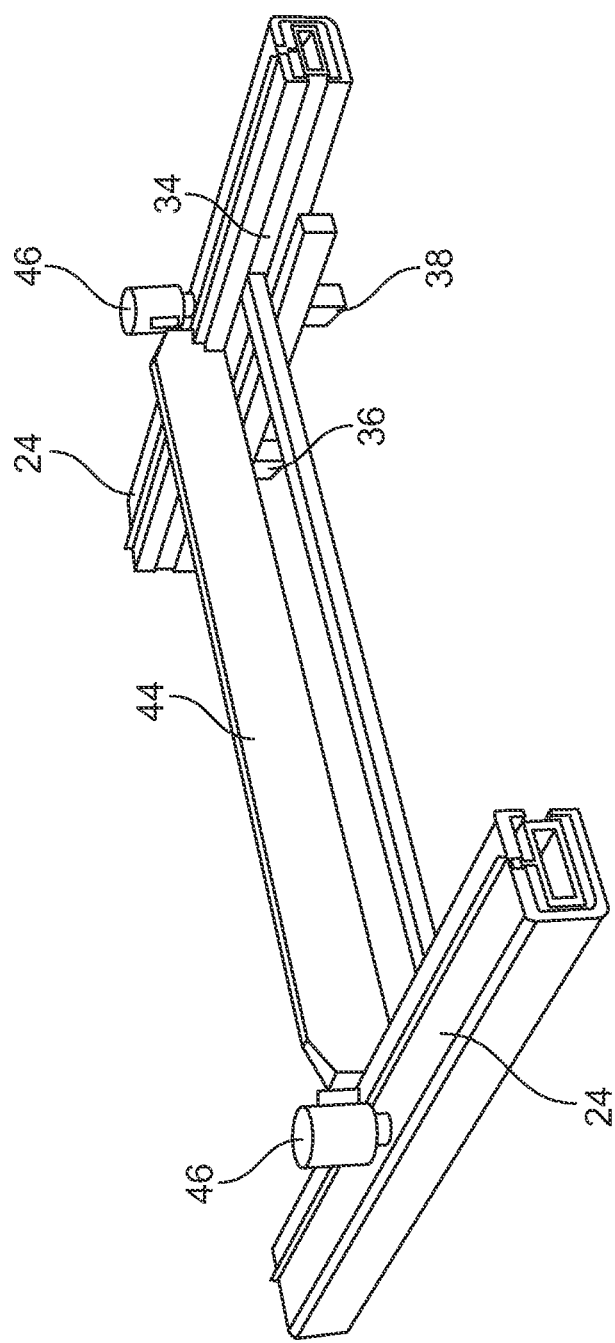
FIG. 14 is a perspective view showing the elevating structure with the chassis gripping device used in one embodiment in a retracted position.
Figure 15:
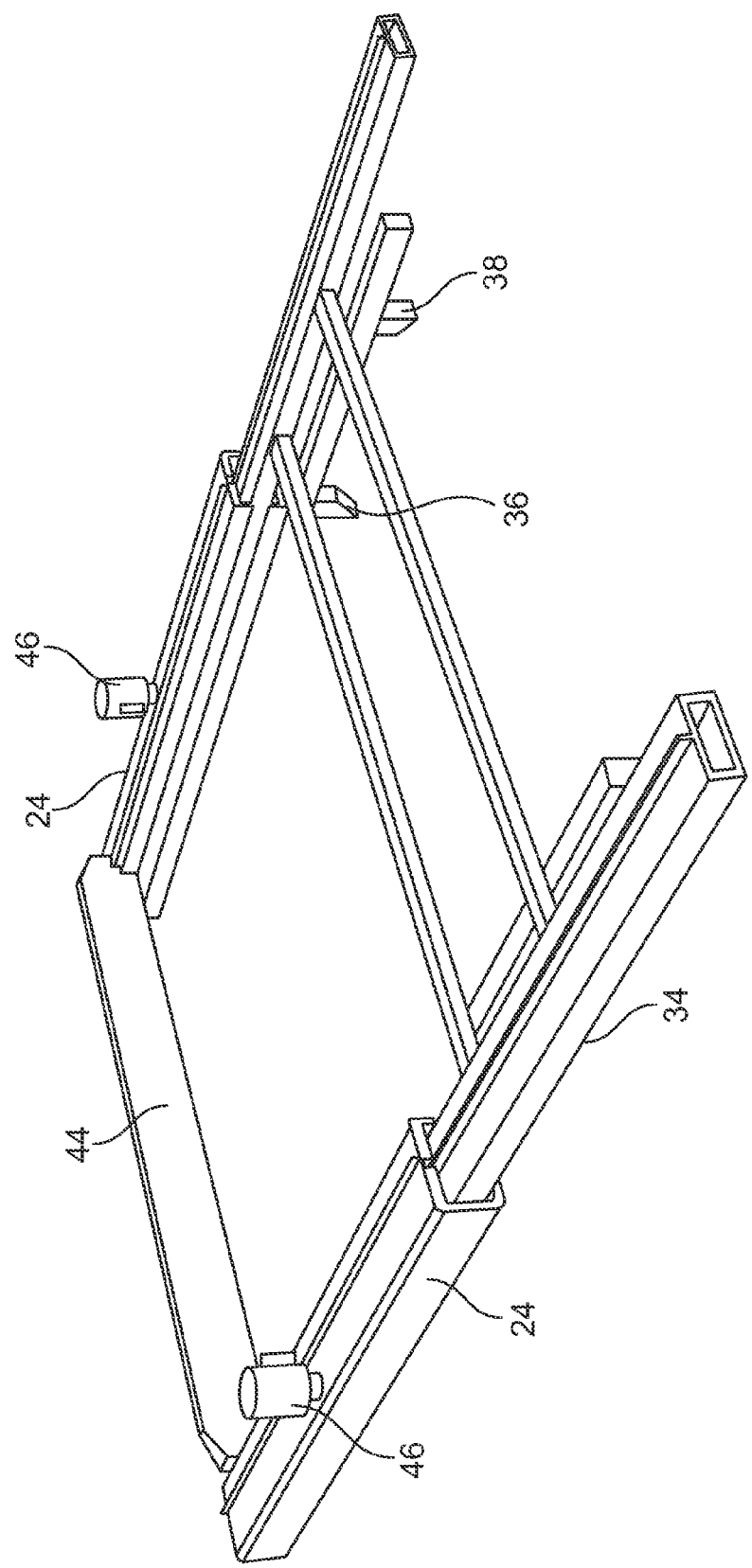
FIG. 15 is a perspective view showing the elevating structure with the chassis gripping device used in one embodiment in an extended position.

The trolley 20 has an elevation system 22 that is capable of raising and lowering an elevating structure 24 that is suspended from the trolley 20 and guided in its vertical motion by low-friction, storage-rack contact members 26 that are attached at respective first and second ends of the elevating structure, as shown in FIG. 6. These contact members 26 are in contact with an inner surface 32 of the respective first and second vertical storage racks 12, 14. As shown in FIGS. 12-13, a chassis gripping device 34 is attached to the elevating structure 24 opposite the trolley rail 17. As shown in FIGS. 10, 14 and 15, chassis gripping device 34 includes first and second chassis contact members 36, 38 that are telescopingly attached to the elevating structure 24. A movable counter weight 44 is attached to the elevating structure 24 opposite the chassis gripping device 34 and proximal to the trolley rail 17, while a drive system 46 is used to power the chassis gripping device 34 and the movable counter weight 44.

In an embodiment, the first and second storage racks 12, 14 are separated by a first distance $L_1$ of no less than 16 feet.

The low-friction, storage-rack contact members 26 can be slide pads, rollers, or any suitable material or mechanism without departing from the spirit and scope of the invention.

Figure 16:
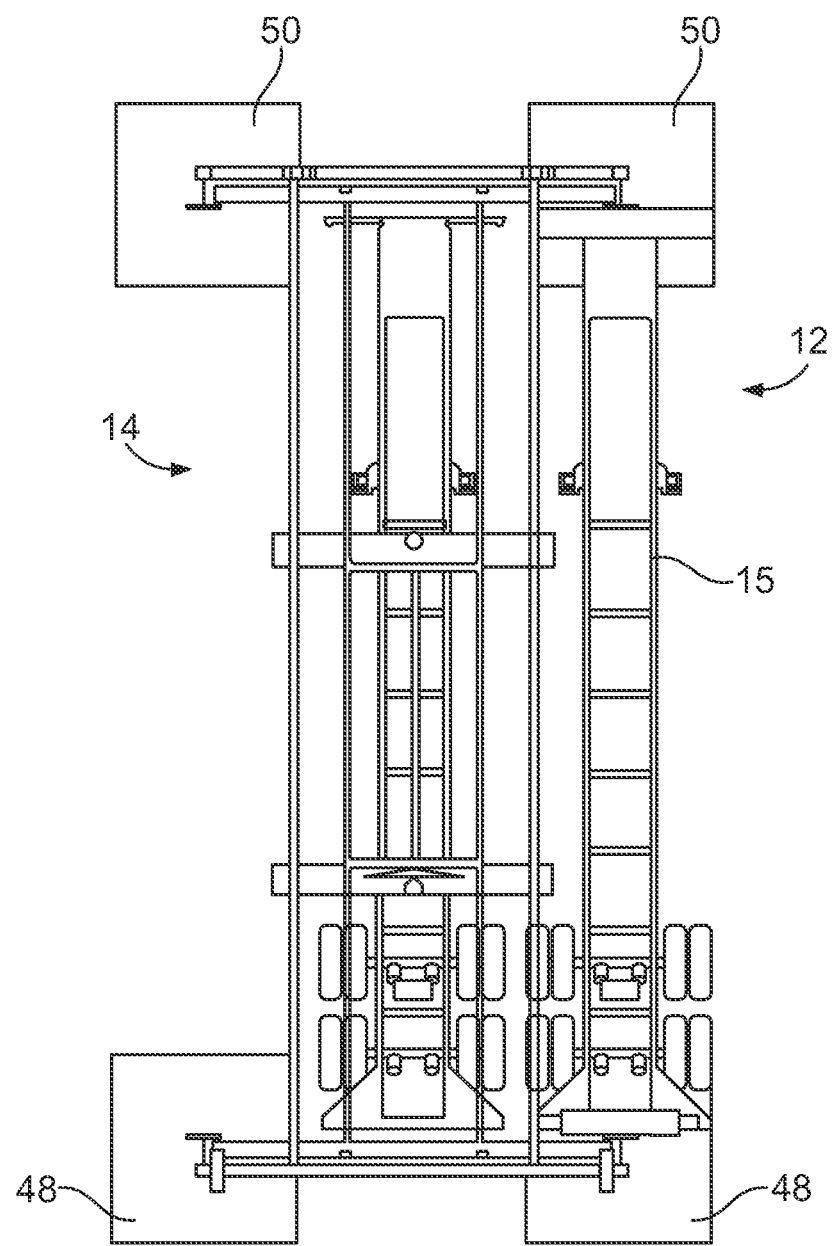
FIG. 16 is an overhead view of the chassis stacker.

In an embodiment, each of the vertical storage racks 12, 14 is comprised of a first and a second vertical column 48, 50 displaced from one another, as shown in FIG. 16. Each one of said columns 48, 50 has a plurality of chassis support members 52 displaced vertically from one another and aligned with an opposing chassis support member 52 on the opposite column. In an embodiment, these chassis support members 52 are shelves, as shown in FIGS. 10 and 11.

Figure 17:
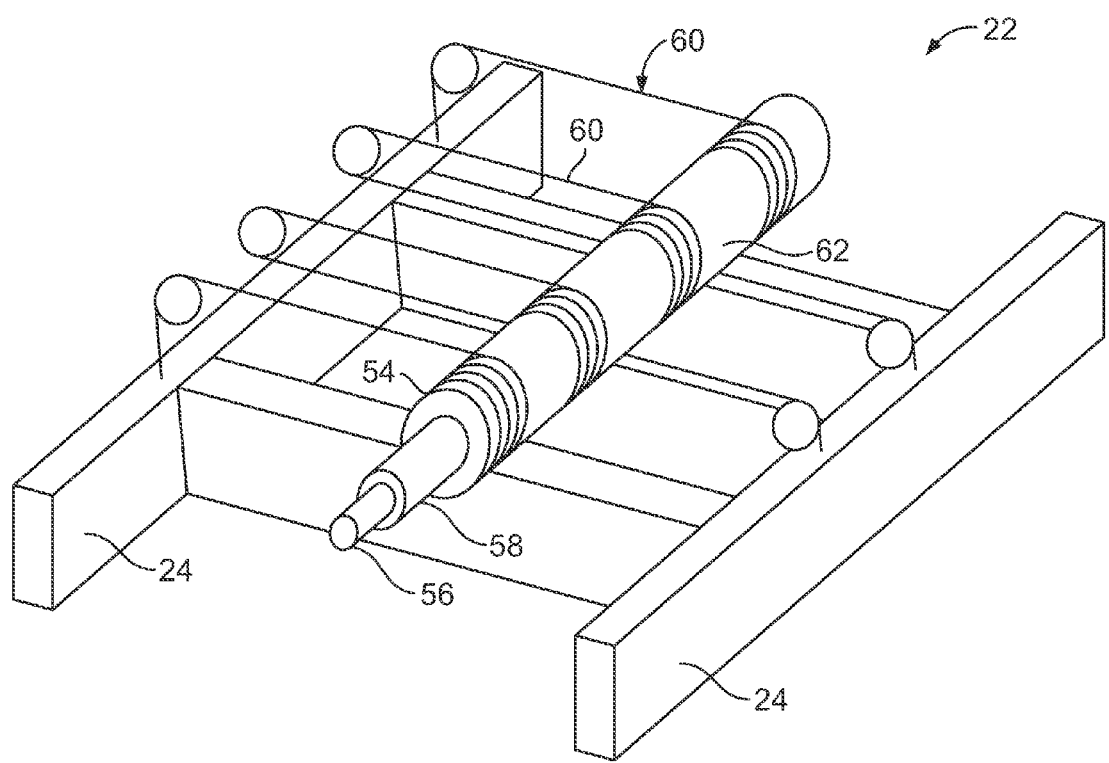
FIG. 17 is a pictorial illustration of an elevation system used in one embodiment.
Figure 24:
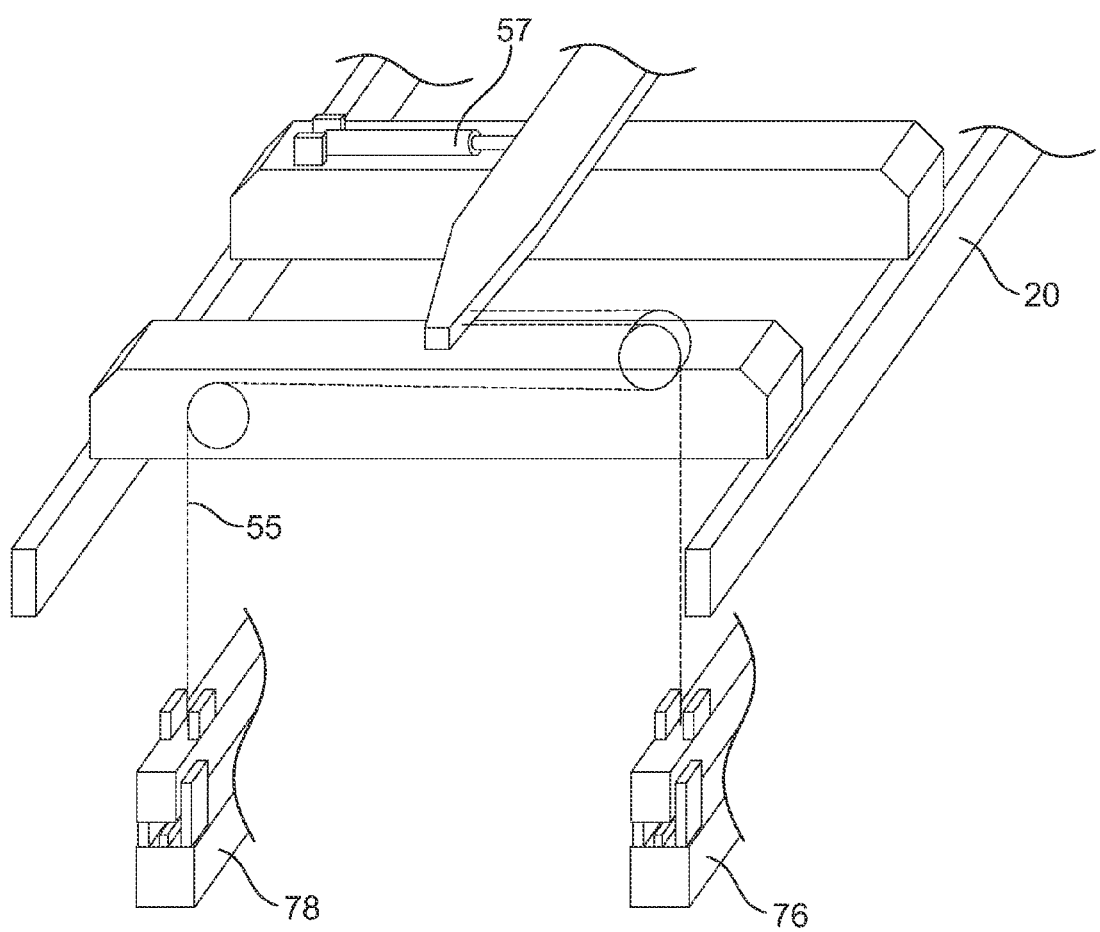
FIG. 24 is perspective view showing an embodiment of a hoist system using a chain attached to a cylinder.
Figure 25:
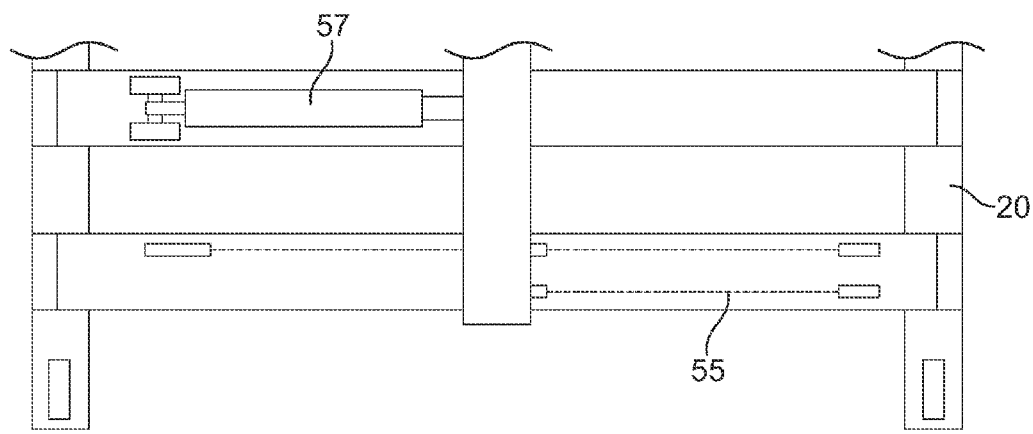
FIG. 25 is a top view of a chassis stacker utilizing an embodiment of a hoist system using a chain attached to a cylinder.
Figure 26:
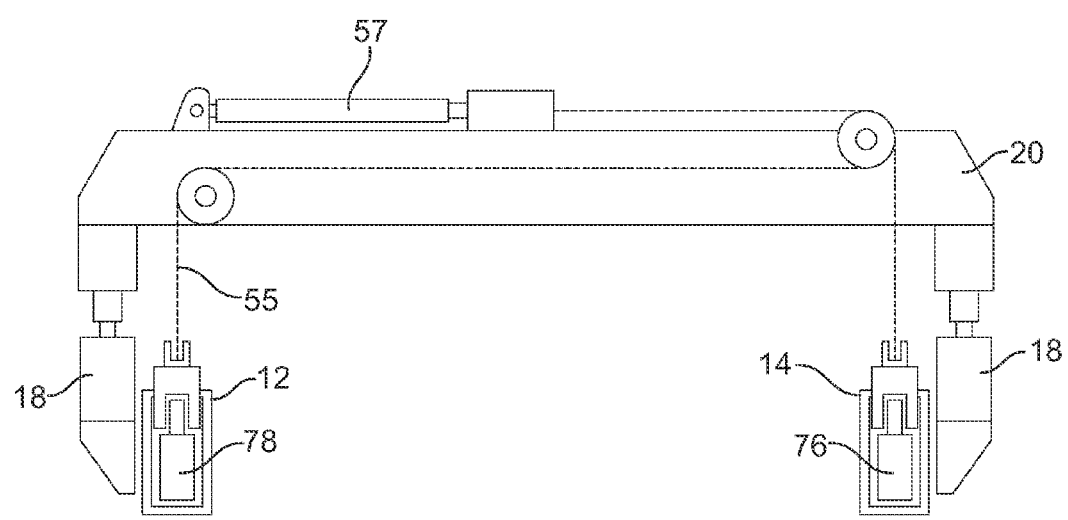
FIG. 26 is a side view of a chassis stacker utilizing an embodiment of a hoist system using a chain attached to a cylinder.

In an embodiment, as shown in FIG. 17, the elevation system 22 includes a hoist system 54, and a motor 56 that powers a gearbox 58 that drives the hoist system 54. In a more particular embodiment, the hoist system 54 includes a wire rope 60 wrapped around a hoist drum 62, as shown in FIG. 17. In still another embodiment, the hoist system 54 includes a chain 55 attached to a cylinder 57, as shown in FIGS. 24-26. In yet another embodiment, the hoist system 54 includes a vertical rack and pinion.

In an embodiment, the counterweight 44 has a first weight, the telescoping structure and trailer chassis 15 combined have a second weight that is less than the first weight.

Figure 18C:
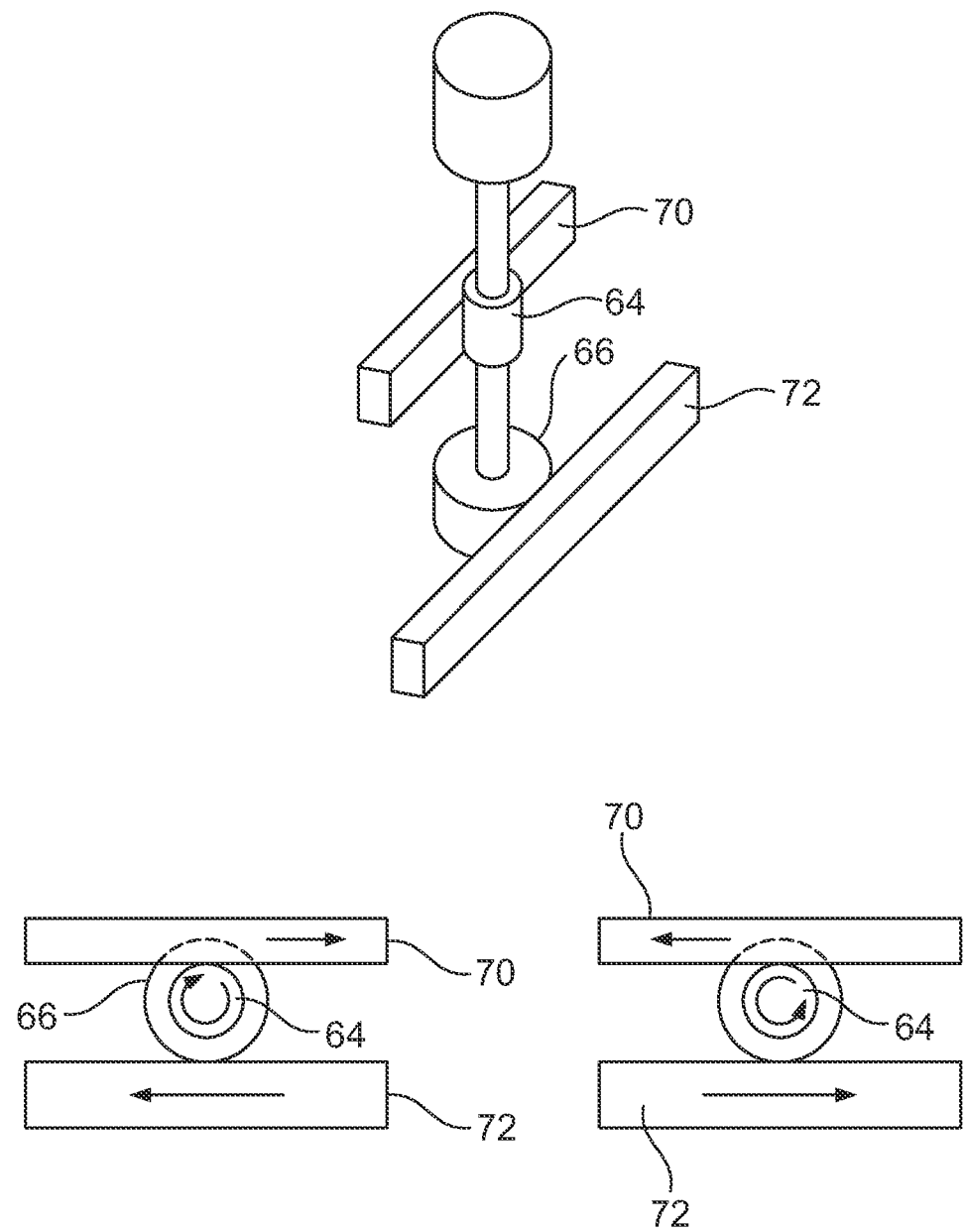
FIG. 18C is a perspective showing a rack and pinion drive system

In an embodiment, as shown in FIG. 18 and FIGS. 18A-C, the drive system 46 is a rack and pinion system that is comprised of a first pinion 64 having a first diameter $D_1$, a second pinion 66 having a second diameter $D_2$ that is greater than the first diameter $D_1$ is mounted on a common shaft 68 with the first pinion 64. In an embodiment as shown in FIG. 18A, motor 67 turns a first drive sprocket 69 which causes a chain 71 to turn a second drive sprocket 73. The turning of the second drive sprocket 73 rotates a shaft 68 which causes pinions 66 and 64 to rotate. A first rack 70 is mounted on the counterweight 44 so as to mesh with the first pinion 64, while a second rack 72 is mounted on the chassis contact member and meshes with the second pinion 66, as shown in FIG. 18C. In such an embodiment, when the common drive shaft 68 rotates in a given direction, the first rack 70 moves in a first direction, and the second rack 72 moves in a second direction opposite the first direction. In another embodiment, as shown in FIG. 18B, a motor 67 directly turns a common shaft 68, thereby causing pinions 64 and 68 to rotate.

The drive system 46 can be powered in various ways including hydraulically or electrically. The drive system 46 may also be comprised of a roller and chain.

Figure 19:
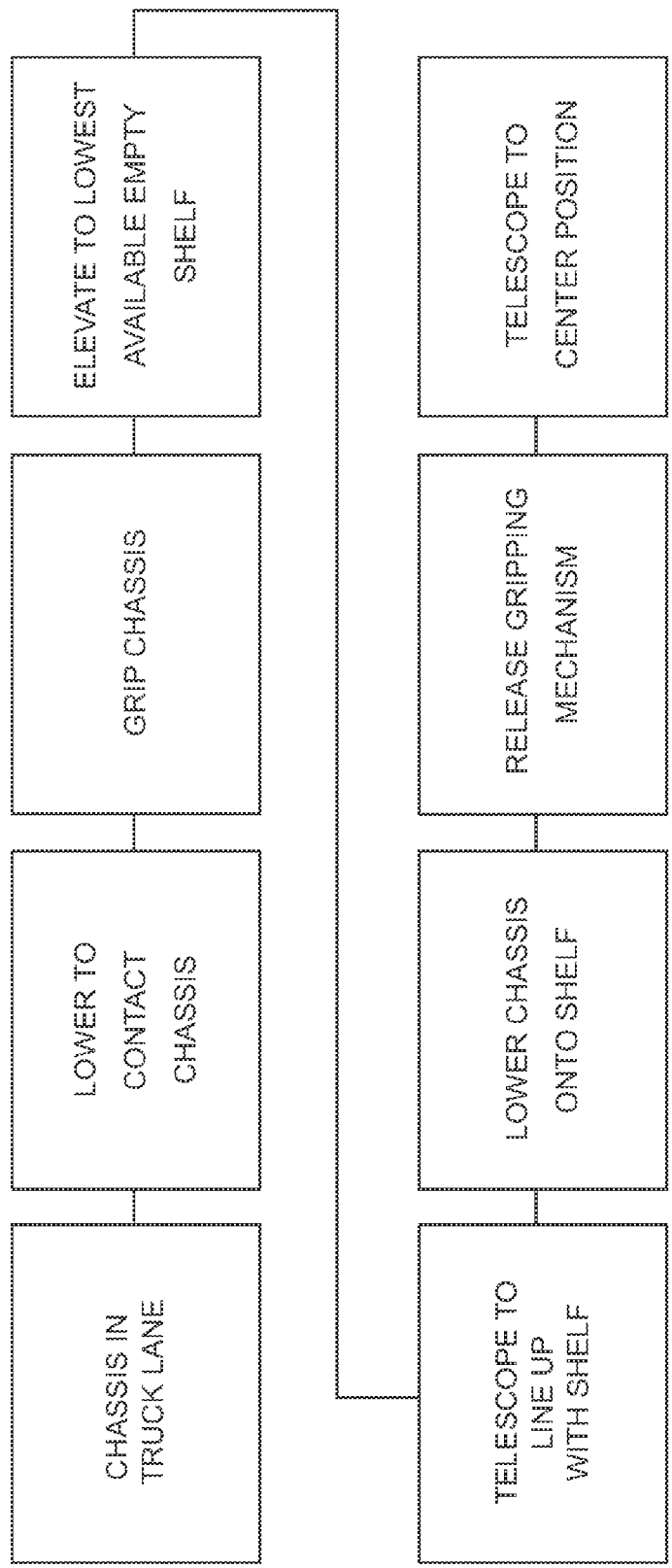
FIG. 19 is a flow chart showing the steps associated with storing a chassis on a storage rack in one of the embodiments.
Figure 20:
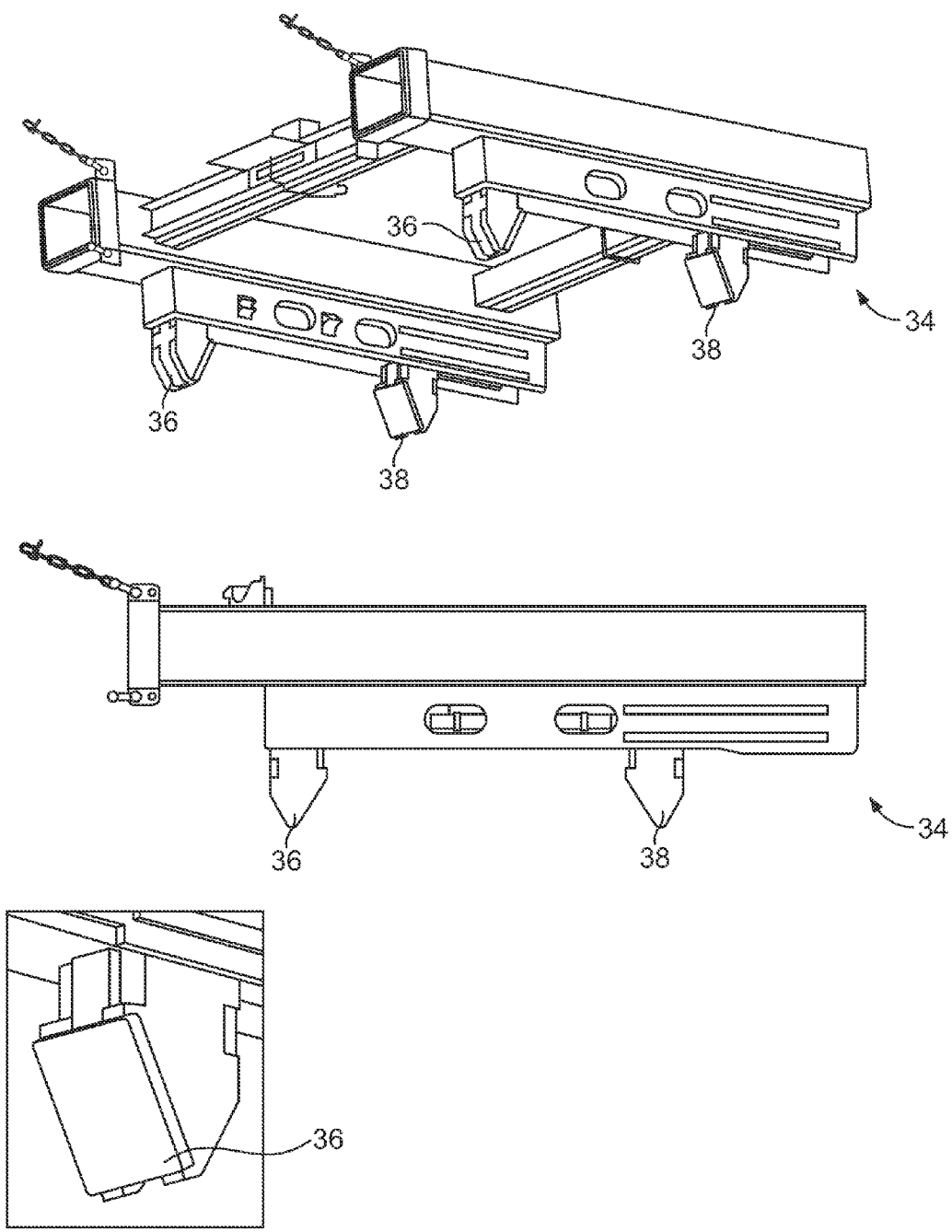
FIG. 20 is a pictorial illustration of a chassis gripping device and chassis contact members used in one embodiment.
Figure 22:
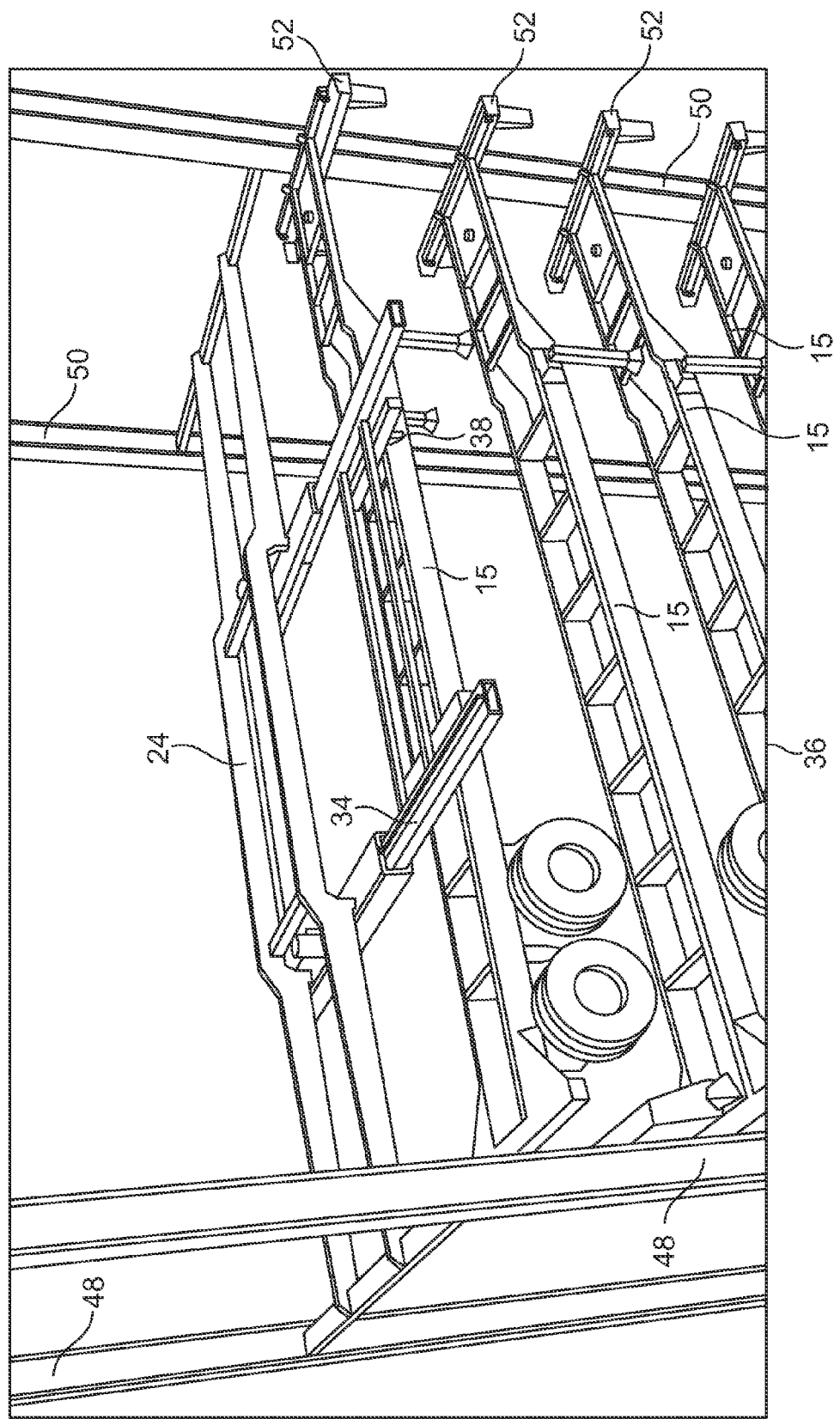
FIG. 22 is a perspective view showing the chassis being telescoped into place on the storage rack.

FIG. 19 shows a flow chart that describes what happens when the chassis stacker is in operation. As shown in FIG. 10, a trailer chassis 15 is positioned between a first and a second vertical storage rack 12, 14. An elevating structure 24 having a chassis gripping device 34 is then lowered to the chassis where the chassis contact members 36, 38, as shown in FIGS. 14, 15, 20 and 21 engage the chassis 15, as shown in FIG. 13. After the chassis 15 is securely engaged, the elevating structure 24 raises the chassis gripping device 34 and the chassis 15 so as to align the chassis 15 with an empty storage space in one of the first and second vertical storage racks 12, 14, as shown in FIG. 12. Once aligned with the empty storage space, the chassis gripping device 34 extends the chassis 15, as shown in FIGS. 13 and 22, into one of the first and second vertical storage racks 12, 14 where the elevating structure 24 then lowers the chassis 15 on to chassis support members 52 located in one of the first and second vertical storage racks 12, 14. After the chassis 15 is positioned on the chassis support members 52, it is disengaged from the chassis gripping device 34 which is then repositioned between the first and the second vertical storage racks 12, 14.

Figure 23:
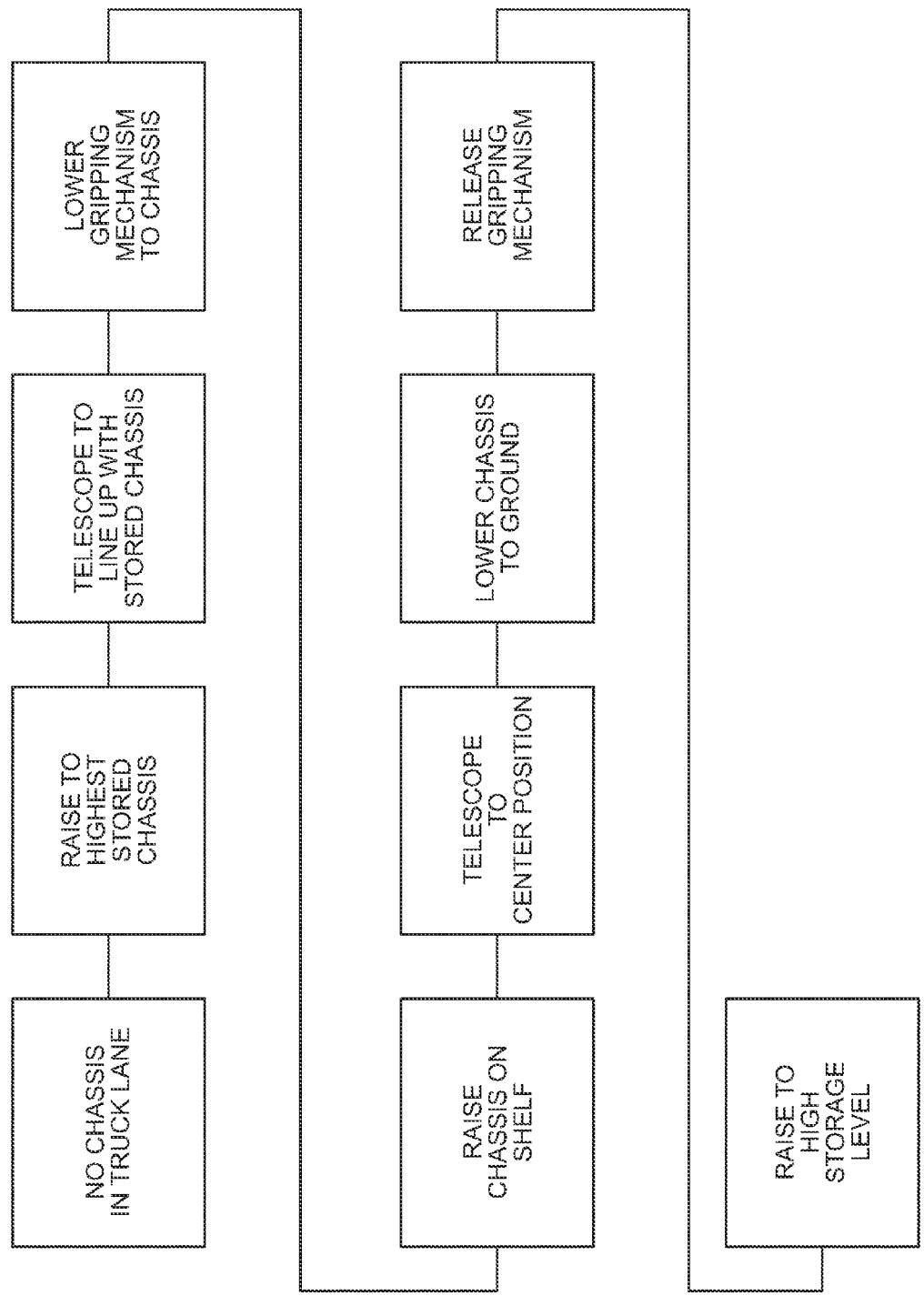
FIG. 23 is a flow chart showing the steps associated with retrieving a chassis on a storage rack in one of the embodiments.

FIG. 23 shows the process of retrieving an empty chassis 15 that is already stored in a storage rack 12. During such an operation, the elevating structure 24 is raised to the highest stored chassis 15. Once aligned, the chassis gripping device 34 is extended to line up with the empty chassis 15. The chassis gripping device 34 is then lowered to the chassis 15 and the chassis contact members 36, 38 grip the chassis 15. Once the chassis has been securely gripped by the chassis contact members 36, 38 the chassis 15 is raised off of the chassis support members 52 and the chassis gripping device 34 is retracted to the center position where the chassis 15 is then lowered to the ground. Once the chassis 15 is on the ground, the chassis contact members 36, 38 are released from the chassis 15 and the chassis gripping mechanism 34 is raised to a high storage level.

Although FIGS. 8, 9, 19 and 23 show storing a chassis on the lowest available shelf and retrieving from the highest occupied shelf, the system could also be configured to store and retrieve from a specified location without departing from the scope and intent of the invention.

All references, including publications, patent applications, and patents, cited herein are hereby incorporated by reference to the same extent as if each reference were individually and specifically indicated to be incorporated by reference and were set forth in its entirety herein.

The use of the terms "a" and "an" and "the" and similar referents in the context of describing the invention (especially in the context of the following claims) are to be construed to cover both the singular and the plural, unless otherwise indicated herein or clearly contradicted by context. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. It should be understood that the illustrated embodiments are exemplary only, and should not be taken as limiting the scope of the invention.

What is claimed is:

1. A chassis stacker comprised of:
   a first and a second vertical storage rack, said first and second racks displaced from one another by a first distance wide enough to accommodate a trailer chassis and connected at a top end by a trolley rail support beam;
   a trolley positioned on the trolley rail support beam, said trolley having an elevation system capable of raising and lowering a first and a second stabilizing beam that are suspended from the trolley and guided in their vertical motion along the first and second vertical storage racks by low-friction, storage-rack contact members attached at respective first and second ends of each of the stabilizing beams, said low-friction, storage-rack contact members in contact with an inner surface of the respective first and second vertical storage racks as the low-friction, storage-rack contact members vertically move along the first and second vertical storage racks;
   a first and a second stabilizing-beam trolley attached to the, respective, first and second stabilizing beams such that the first and second stabilizing-beam trolleys move laterally along the respective first and second stabilizing beams; and
   a spreader extending between and attached to the first and the second stabilizing-beam trolleys such that the first and second stabilizing-beam trolleys move the spreader laterally between the first and second vertical storage racks, said spreader containing a chassis-clamping mechanism that forms a downward-facing portion of the spreader and the chassis-clamping mechanism is disposed below the first and second stabilizing beams, wherein the first and second stabilizing beams are above the trailer chassis when the chassis-clamping mechanism has engaged the trailer chassis.

2. The chassis stacker of claim 1, wherein the trolley is a rail wheel mounted trolley.

3. The chassis stacker of claim 1, wherein the first distance is no less than 16 feet.

4. The chassis stacker of claim 1, wherein the low-friction, storage-rack contact members are slide pads.

5. The chassis stacker of claim 1, wherein the low-friction, storage-rack contact member are rollers.

6. The chassis stacker of claim 1, wherein each of the vertical storage racks is comprised of:
   a first and a second vertical column displaced from one another; and
   each one of said columns having a plurality of chassis support members displaced vertically from one another and aligned with an opposing chassis support member on the opposite column wherein the first and second stabilizing beams are used to raise the trailer chassis from a truck lane and to lower the trailer chassis onto a chassis support member of the plurality of chassis support members.

7. The chassis stacker of claim 6, wherein the chassis support members are shelves.

8. The chassis stacker of claim 1, further comprising a drive system configured to move the first and the second stabilizing-beam trolley along the first and second stabilizing beams respectively, wherein the first and second stabilizing-beam trolleys remain entirely between the respective first and second ends of the stabilizing beams during lateral movement.

9. The chassis stacker system of claim 8, wherein the drive system includes a drive chain driven by a gearbox.

10. The chassis system of claim 9, wherein the gearbox is driven by a motor which drives a chain sprocket.

11. The chassis system of claim 1, wherein the trolley is a rail-wheel mounted trolley positioned on the trolley rail support beam.

* * * * *